United States Patent
Kim et al.

(10) Patent No.: US 7,471,899 B2
(45) Date of Patent: Dec. 30, 2008

(54) WDM-PON SYSTEM BASED ON WAVELENGTH-TUNABLE EXTERNAL CAVITY LASER LIGHT SOURCE

(75) Inventors: Byoung Whi Kim, Daejeon (KR); Hyeong Ho Lee, Daejeon (KR); Jae Woo Yang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 536 days.

(21) Appl. No.: 10/968,423

(22) Filed: Oct. 18, 2004

(65) Prior Publication Data

US 2005/0123300 A1    Jun. 9, 2005

(30) Foreign Application Priority Data

Oct. 18, 2003    (KR) ............... 10-2003-0072803
Sep. 9, 2004     (KR) ............... 10-2004-0072042

(51) Int. Cl.
     H04J 14/00    (2006.01)
(52) U.S. Cl. .......................... 398/69; 398/63
(58) Field of Classification Search ............. 398/66–72, 398/167.5, 95, 63; 372/97, 20
     See application file for complete search history.

(56) References Cited

U.S. PATENT DOCUMENTS

| | | | |
|---|---|---|---|
| 5,886,803 A * | 3/1999 | Yamamoto et al. ............. | 398/41 |
| 6,104,516 A * | 8/2000 | Majima ........................ | 398/69 |
| 6,160,931 A * | 12/2000 | Asakura ...................... | 385/24 |
| 6,941,043 B1 * | 9/2005 | Major et al. ................... | 385/37 |
| 6,970,628 B2 * | 11/2005 | Boudreau ..................... | 385/52 |
| 7,099,360 B2 * | 8/2006 | Bhowmik et al. ............... | 372/29.021 |
| 2001/0048799 A1 * | 12/2001 | King et al. .................... | 385/125 |
| 2002/0109892 A1 * | 8/2002 | Seto et al. ..................... | 359/180 |
| 2004/0105480 A1 * | 6/2004 | Sidorin et al. ................. | 372/97 |
| 2004/0179855 A1 * | 9/2004 | Harada ......................... | 398/197 |
| 2005/0281298 A1 * | 12/2005 | Kupershmidt et al. ......... | 372/34 |

FOREIGN PATENT DOCUMENTS

KR    1020030063085    7/2003

OTHER PUBLICATIONS

Kyeong Soo Kim "On the Evolution of PON-based FTTH solutions" by Information Sciences May 8, 2002.*
Robert D.Feldman "An Evalution of Architectures Incorporating Wavelength Division Multiplexing for Broad-Band Fiber Access" by Journal of Lightwave Technology vol. 16, Sep. 1998.*

* cited by examiner

*Primary Examiner*—Christina Y Leung
(74) *Attorney, Agent, or Firm*—Blakely, Sokoloff, Taylor & Zafman LLP

(57) ABSTRACT

Provided is a WDM-PON system based on a wavelength-tunable ECL. A method of controlling an upstream optical wavelength of an ONT in WDM-PON system, the method comprises: determining upstream optical wavelength information of the ONT corresponding to a downstream optical wavelength predetermined to the ONT newly installed by being connected to a network; in an OLT, loading the determined upstream optical wavelength information onto the downstream optical wavelength assigned to the ONT and transmitting the loaded upstream optical wavelength information to the ONT; in the ONT, generating an upstream optical wavelength based on the upstream optical wavelength information transmitted by being loaded on the downstream optical wavelength from the OLT; and in the ONT, loading upstream data onto the generated upstream optical wavelength and transmitting the loaded upstream data to the OLT.

35 Claims, 17 Drawing Sheets

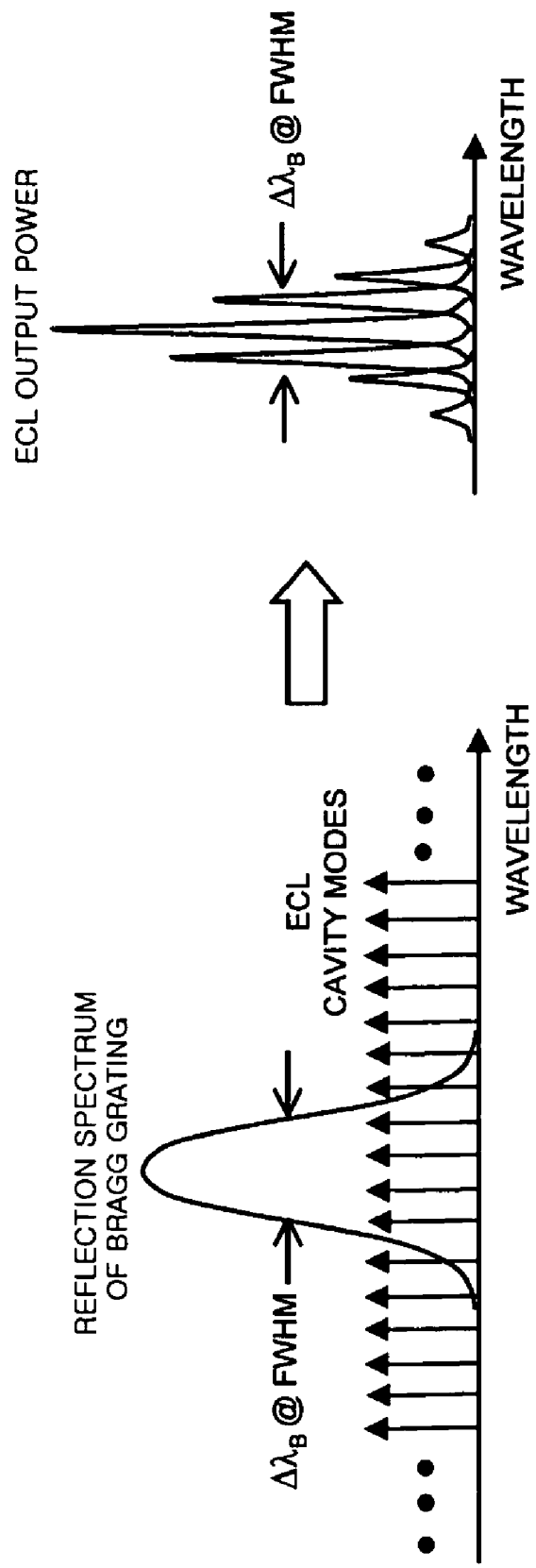

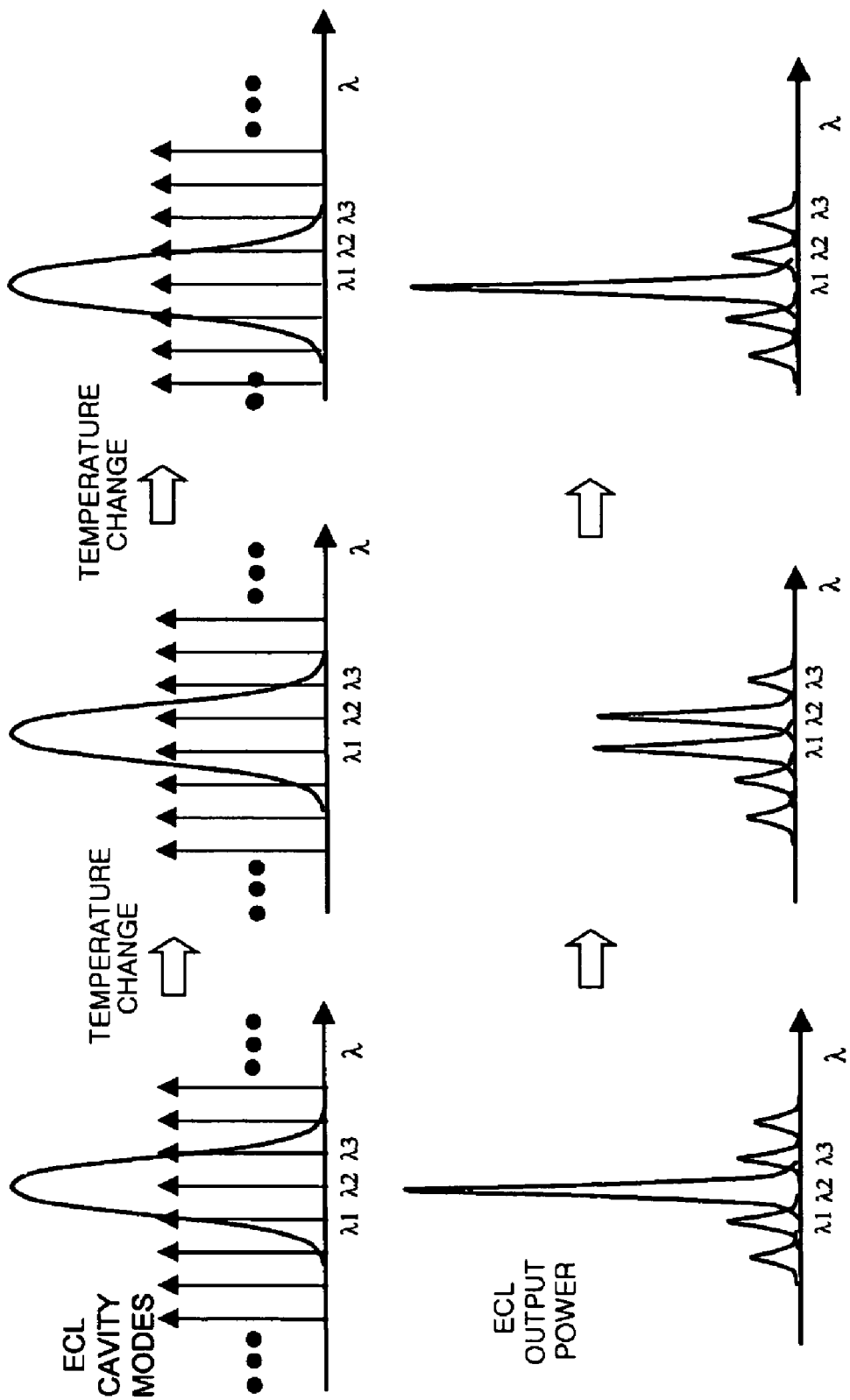

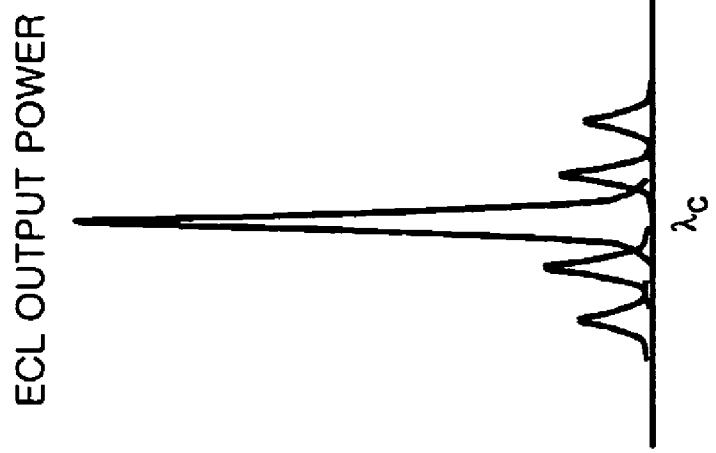
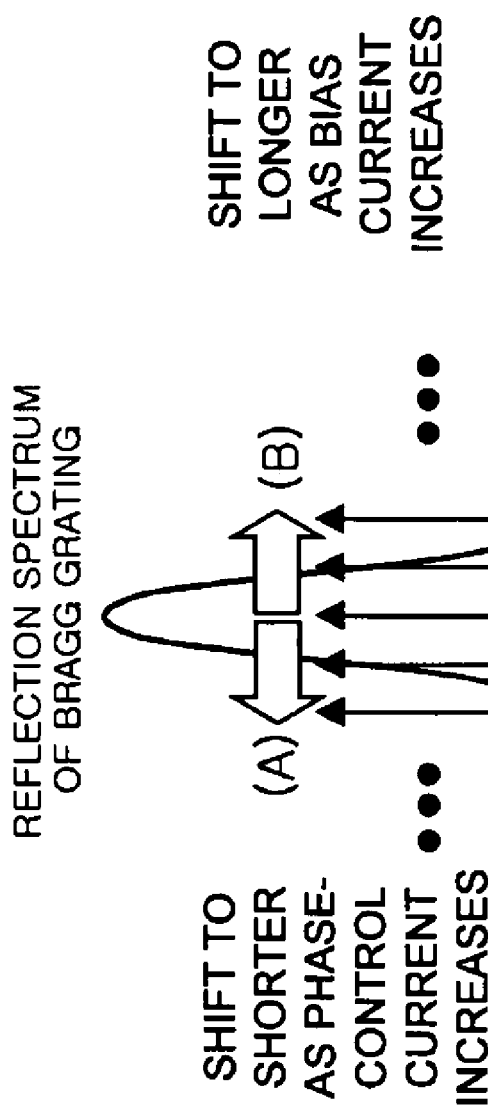

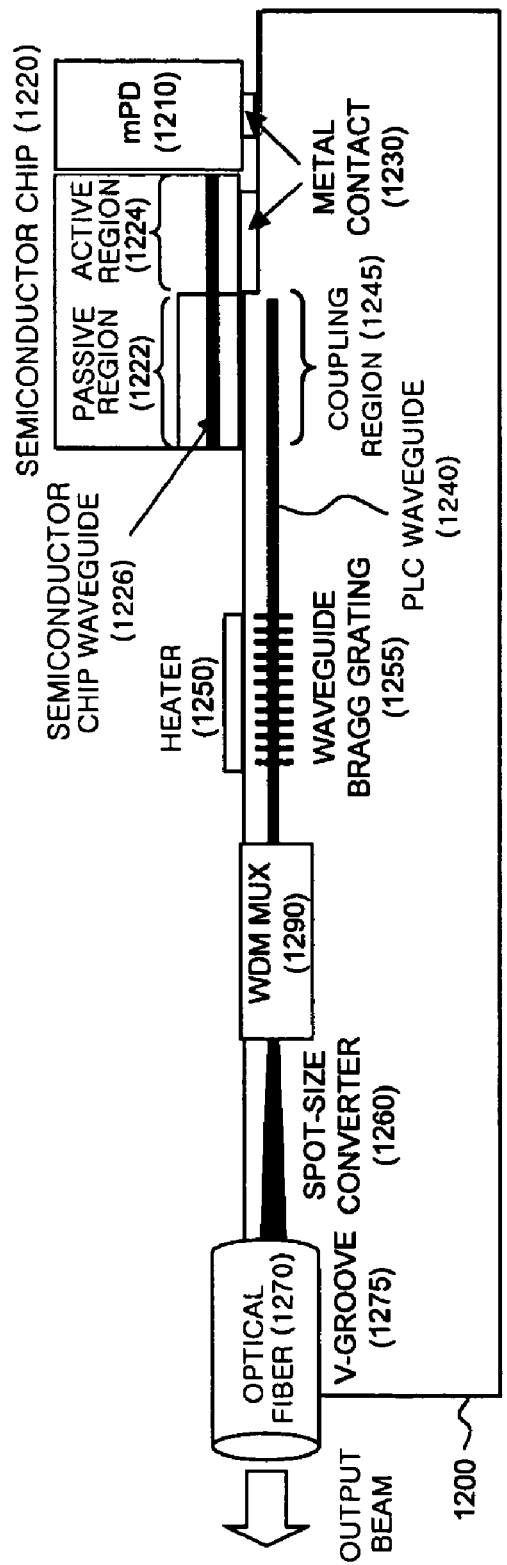
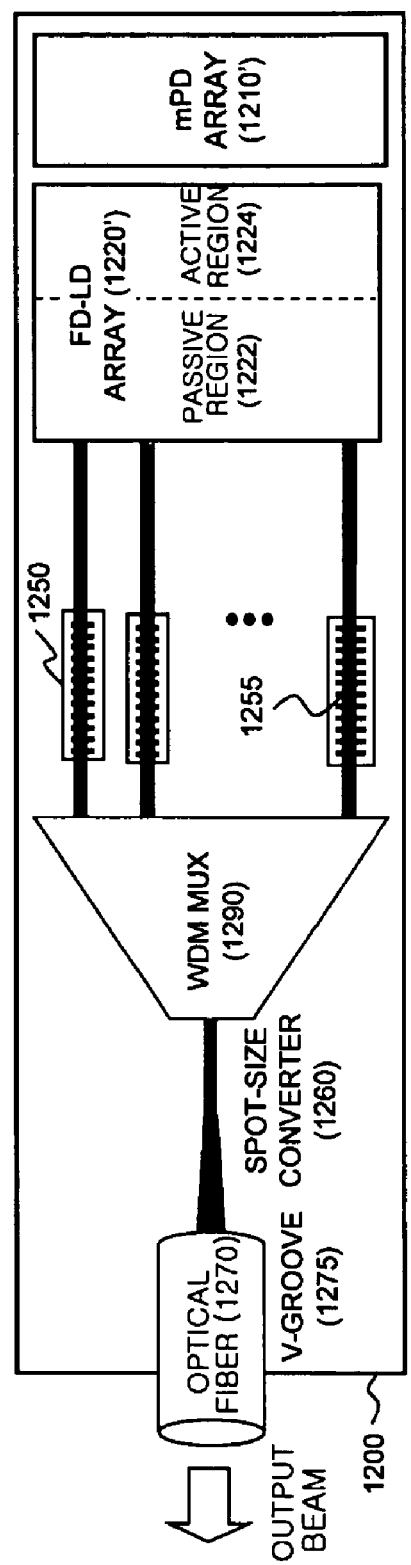
FIG. 12A
FIG. 12B

WDM-PON SYSTEM BASED ON WAVELENGTH-TUNABLE EXTERNAL CAVITY LASER LIGHT SOURCE

BACKGROUND OF THE INVENTION

This application claims the priority of Korean Patent Application Nos. 2003-72803, filed on Oct. 18, 2003 and 2004-72042, filed on Sep. 9, 2004 in the Korean Intellectual Property Office, the disclosures of which are incorporated herein in its entirety by reference.

1. Field of the Invention

The present invention relates to a wavelength division multiplexing passive optical network (WDM-PON) system, and more particularly, to a hybrid-integrated wavelength-tunable external cavity laser (ECL) light source technology required to form a PON based on a WDM method.

2. Description of the Related Art

It is predicted that it will be difficult for a conventional digital subscriber line (DSL) technology via an unshielded twisted pair (UTP) and a conventional cable modem termination system (CMTS) via a hybrid fiber coax (HFC) to provide a bandwidth and a quality guarantee enough to provide a service in which voice, data, and broadcasting are united to subscribers. To solve this problem, a fiber-to-the-home (FTTH) technology connecting to subscribers using optical fiber has been being developed all over the world.

According to expansion of digital home service, it is predicted that an average bandwidth of more than 100 Mbps per subscriber will be required. Therefore, it is predicted that a conventional DSL method and a conventional cable modem method in which it is difficult to provide a bandwidth of this level will be gradually substituted with an FTTH method.

Main problems that must be solved for the FTTH technology to be successfully applied include firstly that it can accommodate an increase of subscribers as much as possible without changing existing optical fiber installations and secondly that an expense required to connect to subscribers using the optical fiber must be low-priced in a level which can be compared with expensees by existing methods (DSL and CMTS for example).

The most important thing in a development of the FTTH technology is to develop a light source suitable for a subscribers network, and according to characteristics of the subscribers network, an economical efficiency, mass productivity, and easiness of installation and management must be most preferentially considered.

The optical subscribers network can be largely divided into a passive optical network (PON) method and an active optical network (AON) method.

The PON method has been being improved in types of asynchronous transfer mode PON (ATM-PON), broadband PON (B-PON), gigabit PON (G-PON), and Ethernet PON (E-PON). The AON method has been being improved in a type of connecting Ethernet switches to each other in a hierarchical structure using the optical fiber. In the PON method and the AON method, an optical transmission line is formed on a single wavelength per transmission direction. However, as for providing a high bandwidth of more than 100 Mbps, which guarantees quality to a subscriber, it is predicted that these methods will confront limitations in a use and effectiveness of an optical path between a central office (CO) and the subscriber. In order to solve this problem, an attempt of introducing a WDM technology to the subscribers network has been proceeding lately.

A WDM-PON method provides an effect of increasing physical links by multiplexing a plurality of optical wavelengths in a strip of optical fiber. Accordingly, since curtailment of expenditure due to reduced number of lines and a centralized operation management in a head-end is possible by accommodating a plurality of subscribers in a single optical transmission line, the first condition that FTTH technology must meet for a success can be satisfied. Also, since traffics of subscribers are separated by allocating an optical channel having a different wavelength per subscriber, advantages exist in security and protocol transparency.

For an FTTH network based on the WDM, various methods of transmitting an optical signal have been suggested till now. There are a method in which a light source is included in a subscriber and a loop-back method in which a modulator instead of the light source is included in the subscriber and light transmitted from a CO is only modulated and re-transmitted to the CO. When a light source is included in a subscriber optical network terminal (ONT), there are a method of using a light source whose wavelength is designated (for example, a distributed feed back laser diode (DFB-LD)) and an injection-locking method of generating an optical wavelength locked to a wavelength of an injected external beam by injecting the external beam from the outside into a broadband light source, such as a fabry perot laser diode (FP-LD).

When a light source whose optical wavelength is designated is installed to a subscriber, light sources emitting different optical wavelengths must be assigned to the other subscribers in a given network.

At this time, N light sources outputting different optical wavelengths $\lambda_1$ through $\lambda_n$ and one N×1 WDM multiplexer (WDM MUX) multiplexing the output optical wavelengths $\lambda_1$ through $\lambda_n$ are installed in a sending end, and one 1×N WDM demultiplexer (WDM DMX) dividing a received signal according to wavelengths and N photo diodes (PDs) reproducing an electric signal from an optical signal are installed in a receiving end. However, in this method, an inventory management problem that ONTs must be produced, managed, and installed to subscribers by different wavelengths is generated. That is, when the method of installing a light source whose optical wavelength is preassigned to a subscriber is massively applied to a market, the inventory management problem may be a big obstacle against market expansion.

In order to solve this inventory management problem, there are various methods of providing an optical beam having a wavelength designated by the CO to a subscriber. One of the various methods is a method where a incoherence broadband light source (e.g., erbium-doped fiber amplifier (EDFA)) is transmitted towards subscribers, divided into by a WDM DMX near the subscribers, injected into each of FP-LDs of the subscribers; one of the FP-LD modes is locked to the injected wavelength; and data are transmitted on the injection-locked mode of the FP-LD.

However, disadvantages of this method are firstly that an expensive EDFA as a broadband light source for an external injection beam must be used and secondly that it is difficult to transmit data larger than 1 Gbps because of temperature unstability and optical interference noise innate in this method.

In order to solve a physical volume problem of optical modules generated at the CO by accommodating a plurality of subscribers based on the WDM-PON, an array type multi-wavelengths light source module has been being briskly developed together with various light source methods. Conventional light source modules are mostly based on a DFB-LD type. However, many problems, such as complexity of a manufacturing process, yield degradation due to an increase of the number of wavelengths, and reliability for a stable operation, must be still improved.

As described above, important problems that the WDM-PON must solve are firstly to achieve lowering the price of optical module, secondly to achieve increasing integration density of optical modules at an optical line terminal (OLT) optical module, and thirdly to achieve an ONT independent on a specific optical wavelength.

SUMMARY OF THE INVENTION

The present invention provides a low-priced optical module through easy mass production by using a passive alignment method based on a planar lightwave circuit (PLC) for a packaging process forming big importance of a current optical module price.

The present invention also provides a method of realizing a multi-wavelengths optical transmission function and a wavelength multiplexing function in a single chip and a method of a wavelength demultiplexing function and a multi-wavelengths optical signal reception function in a single chip in order to reduce a volume of an OLT optical module by raising a integration density of the OLT optical module so that a CO can accommodate tens thousands to over one hundred thousands subscribers.

The present invention also provides a method that an ONT includes a light source but a specific optical wavelength is not designated to the light source in order to solve limitation problems of mass production and management, which are disadvantages of an ONT in which a light source whose optical wavelength is designated is installed, and simultaneously solve disadvantages such as an optical power budget shortage which an optical subscribers network of a loop-back type in which a light source is not included in an ONT has, complexity of an ONT control circuit, and operational reliability of the ONT. By using this method, the so called inventory problem that the ONT is classified by an optical wavelength can be solved by granting a broadband wavelength-tunable ability by which all bands of wavelengths multiplexed in a single optical fiber can be tuned. That is, an optical wavelength of a light source of the ONT can be set by an installer when the ONT is installed in a subscriber region, or by a remote control through an optical wavelength control signal transmitted from an OLT to the ONT. The optical wavelength can be set by controlling temperature of a waveguide Bragg grating (WBG) in the ONT optical transmission module. Therefore, since a specific optical wavelength is not designated to an ONT when manufacturing the ONT and is manually or automatically set after installation of the ONT, the inventory problem can be solved.

According to an aspect of the present invention, there is provided a wavelength division multiplexing passive optical network (WDM-PON) system based on a wavelength-tunable external cavity laser (ECL) light source, the WDM-PON system comprising: an optical line terminal (OLT) comprising an optical transmitter in which a first wavelength-tunable waveguide Bragg grating (WBG) is formed, which is composed of a first ECL array generating optical wavelengths for data transmission, and an optical receiver composed of a photo diode (PD) array, wherein the optical transmitter further comprises a first WDM multiplexer (MUX) multiplexing a plurality of optical wavelengths output from the first ECL array and the optical receiver further comprises a first WDM demultiplexer (DMX) receiving a multiplexed optical wavelength and dividing the input multiplexed optical wavelength into a plurality of optical wavelengths; a plurality of optical network terminals (ONTs), each ONT comprising an optical receiver receiving an optical wavelength for data transmission transmitted from the OLT and an optical transmitter in which a second wavelength-tunable WBG is formed, which is composed of a second ECL generating a wavelength-tunable optical wavelength by controlling a temperature applied to the second wavelength-tunable WBG; a second WDM DMX, which is located in a main distribution frame (MDF) placed near the plurality of ONTs, divides a multiplexed optical wavelength transmitted from the first WDM MUX via an optical fiber into the plurality of optical wavelengths, and connects each optical wavelength to a relevant ONT of the plurality of ONTs; and a second WDM MUX, which is located in the MDF placed near the plurality of ONTs, multiplexes a plurality of optical wavelengths output from optical transmitters of the plurality of ONTs, and transmits the multiplexed optical wavelengths to the first WDM DMX of the OLT via an optical fiber.

According to another aspect of the present invention, there is provided an OLT based on a wavelength-tunable ECL light source in a WDM-PON system based on a wavelength-tunable ECL light source, the OLT comprising: an optical transmitter comprising an ECL array generating tunable optical wavelengths for data transmission, formed with LD array and WMG array in a planar lightwave circuit (PLC); a WDM MUX multiplexing a plurality of optical wavelengths output from the ECL array of the optical transmitter; a WDM DMX dividing multiplexed optical wavelengths input from a plurality of ONTs and distributing the plurality of optical wavelengths; and an optical receiver composed of a PD array detecting the plurality of optical wavelengths distributed from the WDM DMX.

According to another aspect of the present invention, there is provided an ONT based on a wavelength-tunable ECL in a WDM-PON system based on a wavelength-tunable ECL, the ONT comprising: an optical receiver (Rx) receiving an optical wavelength transmitted from an OLT and converting the received optical wavelength into an electric signal; a data control center (DCC) separating general data and WBG control data from information converted into the electric signal by the Rx; a wavelength control center (WCC) receiving the WBG control data from the DCC, controlling a temperature of a WBG according to the WBG control data, and controlling an upstream optical wavelength for upstream data transmission; and an ECL modulating upstream data onto the upstream optical wavelength and transmitting the modulated upstream data to the OLT.

According to another aspect of the present invention, there is provided a method of controlling an upstream optical wavelength of an ONT in WDM-PON system, the method comprising: determining upstream optical wavelength information of the ONT corresponding to a downstream optical wavelength predetermined to the ONT newly installed by being connected to a network; in an OLT, loading the determined upstream optical wavelength information onto the downstream optical wavelength assigned to the ONT and transmitting the loaded upstream optical wavelength information to the ONT; in the ONT, generating an upstream optical wavelength based on the upstream optical wavelength information transmitted by being loaded on the downstream optical wavelength from the OLT; and in the ONT, loading upstream data onto the generated upstream optical wavelength and transmitting the loaded upstream data to the OLT.

BRIEF DESCRIPTION OF THE DRAWINGS

The above and other features and advantages of the present invention will become more apparent by describing in detail exemplary embodiments thereof with reference to the attached drawings in which:

FIGS. 6A and 6B are graphs for illustrating a multi mode operational ECL according to an embodiment of the present invention;

FIGS. 8A, 8B and 8C are graphs for illustrating a mode hopping phenomenon in an ECL structure;

FIGS. 9A and 9B are graphs for illustrating a mechanism suppressing the mode hopping in a case of the single mode operational ECL;

FIGS. 12A and 12B are respectively a top view and a side view of a multi mode operational ECL array as an example of an OLT optical transmission module (OLT-TOSA) using a surface mount method according to an embodiment of the present invention;

DETAILED DESCRIPTION OF THE INVENTION

Hereinafter, the present invention will now be described more fully with reference to the accompanying drawings, in which embodiments of the invention are shown.

Figure 1:
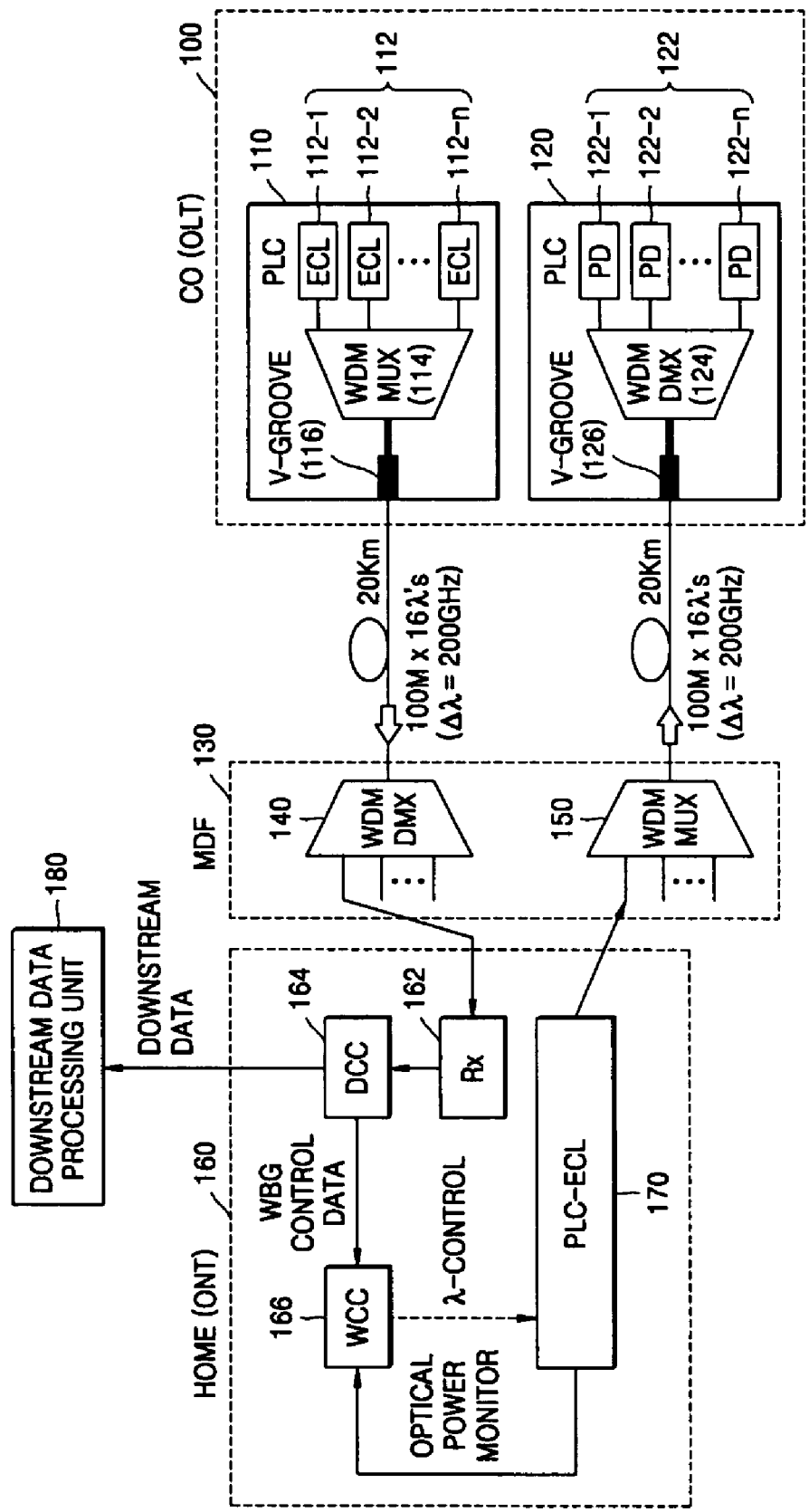
FIG. 1 is a block diagram of a WDM-PON according to an embodiment of the present invention.

FIG. 1 is a block diagram of a WDM-PON according to an embodiment of the present invention.

Referring to FIG. 1, a network structure of the WDM-PON does not have any active elements between an OLT 100 corresponding to a CO and an ONT 160 corresponding to a subscriber.

The OLT 100 located in the CO includes a multi-channel optical transmission module 110 in which an ECL array 112 including a plurality of ECLs 112-1 through 112-n integrated on a PLC platform in a hybrid pattern transmits beams having different wavelengths and a multi-channel optical reception module 120 in which a PD array 122 including a plurality of PDs 122-1 through 122-n integrated on the PLC platform in the hybrid pattern receives input beams having different wavelengths.

The ONT 160 includes a wavelength-tunable ECL which can control an optical wavelength at will.

In FIG. 1, a method of making the ONT 160 wavelength-independent even if a light source is installed in the ONT 160 is suggested. An optical transmission module of the ONT 160 takes a type of an ECL including an FP-LD and a WBG, and a center wavelength of a WBG reflection band is set to a desired optical wavelength by a thermo-optic effect. For setting an optical wavelength for transmitting upstream data of the ONT 160, a method of manually setting a designated wavelength when an installer installs the ONT 160 in a subscriber's home or a method of automatically setting a wavelength of the ONT 160 to an optical wavelength allocated to a subscriber by transmitting wavelength information from the OLT 100 to the ONT 160 after the ONT 160 is installed in the subscriber's home is used.

In FIG. 1, in order to form the WDM-PON, a PLC-based ECL (PLC-ECL) is chosen as a light source module, a center wavelength of a beam outputting from a PLC-ECL 170 of the ONT 160 can be tuned to all bands of wavelengths accommodated in an optical fiber, a center wavelength of a beam outputting from a PLC-ECL 112 of the OLT 100 is set to a wavelength for optical communication defined by ITU-T by being tuned very little to the left or right off a center wavelength set when manufacturing, optical signals are transmitted by directly modulating data into the PLC-ECLs 112 and 170, and the multi-channel optical transmission module and the multi-channel optical reception module of the OLT 100 respectively include a WDM MUX 114 and a WDM DMX 124 integrated on a single chip.

Here, characteristics of the wavelength-tunable optical transmission module including the PLC-ECL 112 or 170 are as follows.

An FP-LD is butt-mounted or surface-mounted on a PLC, and a WBG is formed at a location on an optical waveguide between a V-groove into which an optical fiber is inserted and the FP-LD. An output optical wavelength of the PLC-ECL 112 or 170 is determined by one or a plurality of longitudinal mode(s) included in the WBG reflection band among optical wavelengths satisfying a phase matching condition determined by an external cavity distance formed between the FP-LD and the WBG.

Therefore, if a temperature of the WBG is locally changed, an effective refractivity of the WBG is changed. In this way, the output optical wavelength of the PLC-ECL 112 or 170 can be tuned to a designated wavelength.

Downstream optical signal distribution is passively performed in a WDM DMX 140 near the ONT 160. All optical transmission modules 110 and optical reception modules 120 are based on a PLC for minimization of packaging and mass production.

In the optical transmission module 110 of the OLT 100, ECLs 112-1 through 112-n, each ECL including a FP-LD and a WBG, are arranged in an array pattern on a same chip. In each ECL 112, a reflection center wavelength of each WBG is designed to have a wavelength near one of optical wavelengths recommended by ITU-T, and a temperature of the WBG is fine-tuned so that an output optical wavelength is identical to the optical wavelength recommended by ITU-T. An output end of each ECL 112 is input to the WDM MUX 114 formed on the same chip, and a wavelength-multiplexed optical signal is output from the WDM MUX 114. By the ECL array 112 and the WDM MUX 114 forming the PLC on the same chip, a finally output optical fiber pig-tailing is simplified as one process.

In the optical transmission module 110 installed in the OLT 100, the PLC-ECL array 112 including a plurality of ECLs 112-1 through 112-n is integrated with the N X 1 WDM MUX 114 on a single wafer, and a plurality of light sources are combined to one output end. A V-groove (VG) 116 is located at the output end of the WDM MUX 114 to connect a strip of optical fiber. In the optical reception module 120 installed in the OLT 100, a VG 126 is located to insert a strip of optical fiber on a single chip, the 1×N WDM DMX 124 connected to the VG 126 is located, and the plurality of PDs 122-1 through 122-n receiving optical signals from N output ports of the WDM DMX 124 are arranged in the array pattern.

The biggest characteristic of the optical transmission module 110 and the optical reception module 120 of the OLT 100 is that an optical fiber pigtail is simple since the passive alignment method is used and each of the output end of the optical transmission module 110 and the input end of the optical reception module 120 is united to one port. The simple optical fiber pigtailing may give effects of significantly lowering packaging expense, improving yield, and improving the module reliability. Also, since each of the optical transmission module 110 and the optical reception module 120 is integrated on a single chip, a physical volume taken by the modules due to mass installation of optical modules can be greatly reduced.

In the optical reception module 120 of the OLT 100, the WDM DMX 124 is located at the input end of a chip, and the PDs 122-1 through 122-n are connected to output ends of the WDM DMX 124. Like the optical transmission module 110 of the OLT 100, the WDM DMX 124 and the PD array 122 are integrated on a single chip.

Wavelengths of an optical-wavelength-multiplexed optical signal output from the optical transmission module 110 of the OLT 100 are divided in the WDM DMX 140 at an MDF located near a residential area of subscribers, and each divided optical wavelength is transmitted to each relevant ONT 160.

An optical signal transmitted from the WDM DMX 140 is converted into an electric signal by an optical receiver (Rx) 162 of the ONT 160 and input to a data control center (DCC) 164.

The DCC 164 separates general data and WBG control data from data input from the optical transmission module 110 of the OLT 100, transmits the general data to a downstream data processing unit 180, and transmits the WBG control data to a wavelength control center (WCC) 166. The WCC 166 reads a wavelength value from the WBG control data input from the DCC 164 and controls temperature of the WBG of the PLC-ECL 170 corresponding to the wavelength value.

An output of an mPD, which is feedbacked from the PLC-ECL 170 to the WCC 166, may be used for monitoring an optical power of an ECL and utilized to find out a maximum point of an ECL optical power by fine-tuning a WBG reflection center wavelength with reference to a wavelength allocated from the OLT 100. This wavelength tuning function may be used to optimize an optical wavelength of the PLC-ECL 170 of the ONT 160 so that a receiving optical power of the OLT 100 is the maximized.

At this time, if information related to optical reception sensitivity received from the optical transmission module 110 of the OLT 100 is separated from data by the DCC 164 and transmitted to the WCC 166, the WCC 166 adjusts an output optical wavelength by controlling a temperature of the WBG of the PLC-ECL 170.

Figure 2:
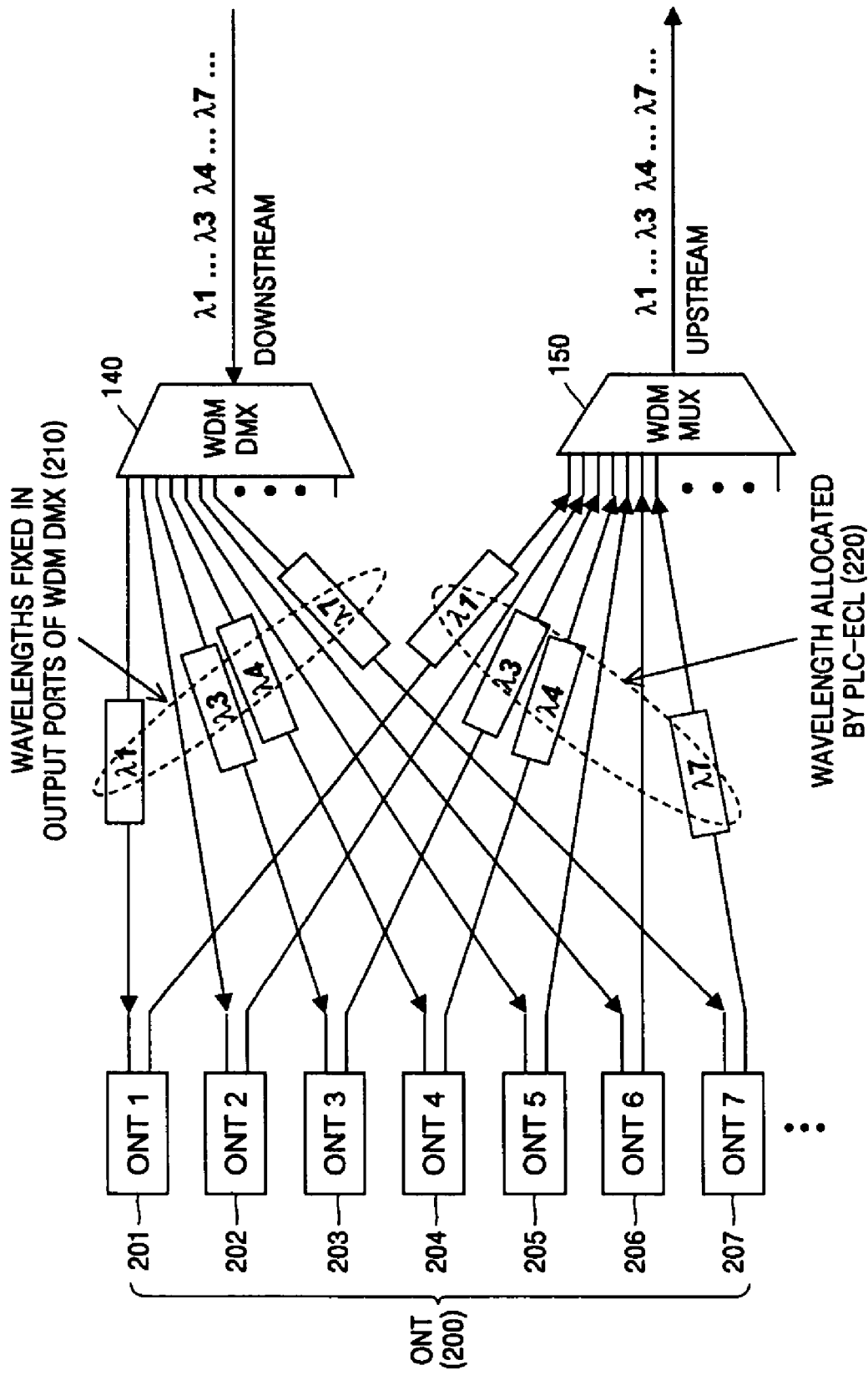
FIG. 2 illustrates a process of setting optical communication paths in FIG. 1.

FIG. 2 illustrates a process of setting optical communication paths in FIG. 1.

Referring to FIG. 2, downstream optical wavelengths of ONTs 200 are determined by output ports of the WDM DMX 140, which is located near the ONTs 200, connected to input ends of an ONT1 201, an ONT2 202, an ONT3 203, an ONT4 204, an ONT5 205, an ONT6 206, and an ONT7 207, and this optical wavelength information physically determined for the ONTs 200 is stored in the OLT 100 as network setup information.

Likewise, upstream optical wavelengths are determined by input ports of the WDM MUX 150, which is located near the ONTs 200, connected to output ends of the ONTs 200, and this information is also stored in the OLT 100 as the network setup information.

FIG. 2 shows a case where the WDM MUX 150 and the WDM DMX 140 located near the ONTs 200 are connected to the ONTs 200 in the same order and where an upstream optical wavelength and a downstream optical wavelength for each ONT 200 are equal. A reference number 210 indicates fixed wavelengths output from the output ports of the WDM DMX 140. A reference number 220 indicates wavelengths allocated by the PLC-ECL 170.

Figure 3:
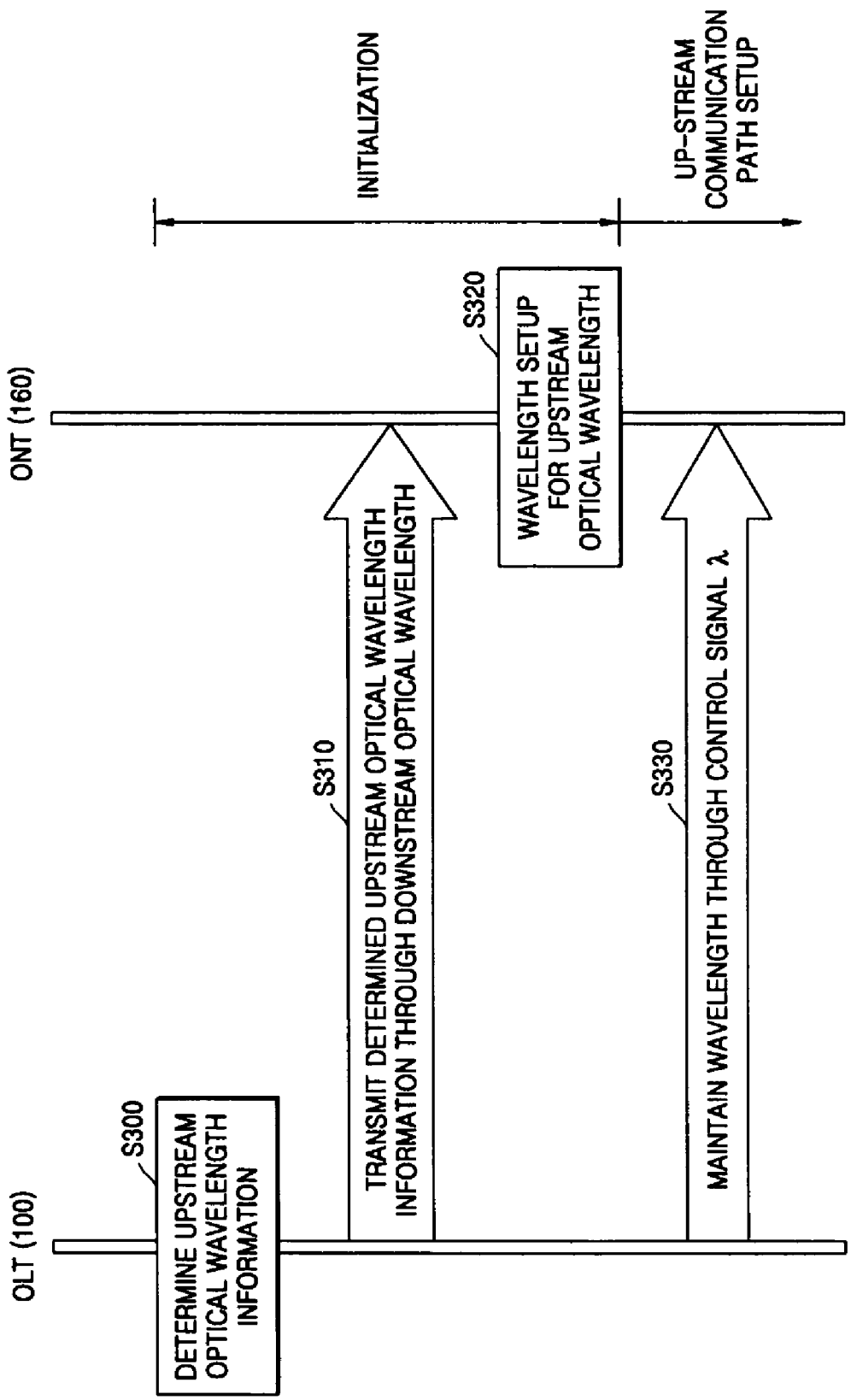
FIG. 3 illustrates a process that an upstream optical wavelength of an ONT of FIG. 1 is allocated by an OLT in a remote.

FIG. 3 illustrates a process that an upstream optical wavelength of the ONT 160 of FIG. 1 is set remotely by the OLT 100.

Referring to FIG. 3, after the ONT 160 is installed, the OLT 100 looks up upstream optical wavelength information of the ONT 160 by a downstream optical wavelength determined to the ONT 160 in operation S300.

The OLT 100 transmits the upstream optical wavelength information determined through the downstream optical wavelength allocated to the ONT 160 to the ONT 160 in operation S310.

The ONT 160 obtains the upstream optical wavelength information through the downstream optical wavelength received from the OLT 100 and sets up an upstream optical wavelength for upstream data transmission from the upstream optical wavelength information in operation S320.

As a detailed setup process, the upstream optical wavelength information is transmitted to the WCC 166, and the WCC 166 provides a predetermined current to a wavelength tuning portion of the PLC-ECL 170 so that a designated upstream optical wavelength is tuned.

When this initialization process is finished, upstream data is carried by the upstream optical wavelength to the OLT 100 in operation S330.

Figure 4:
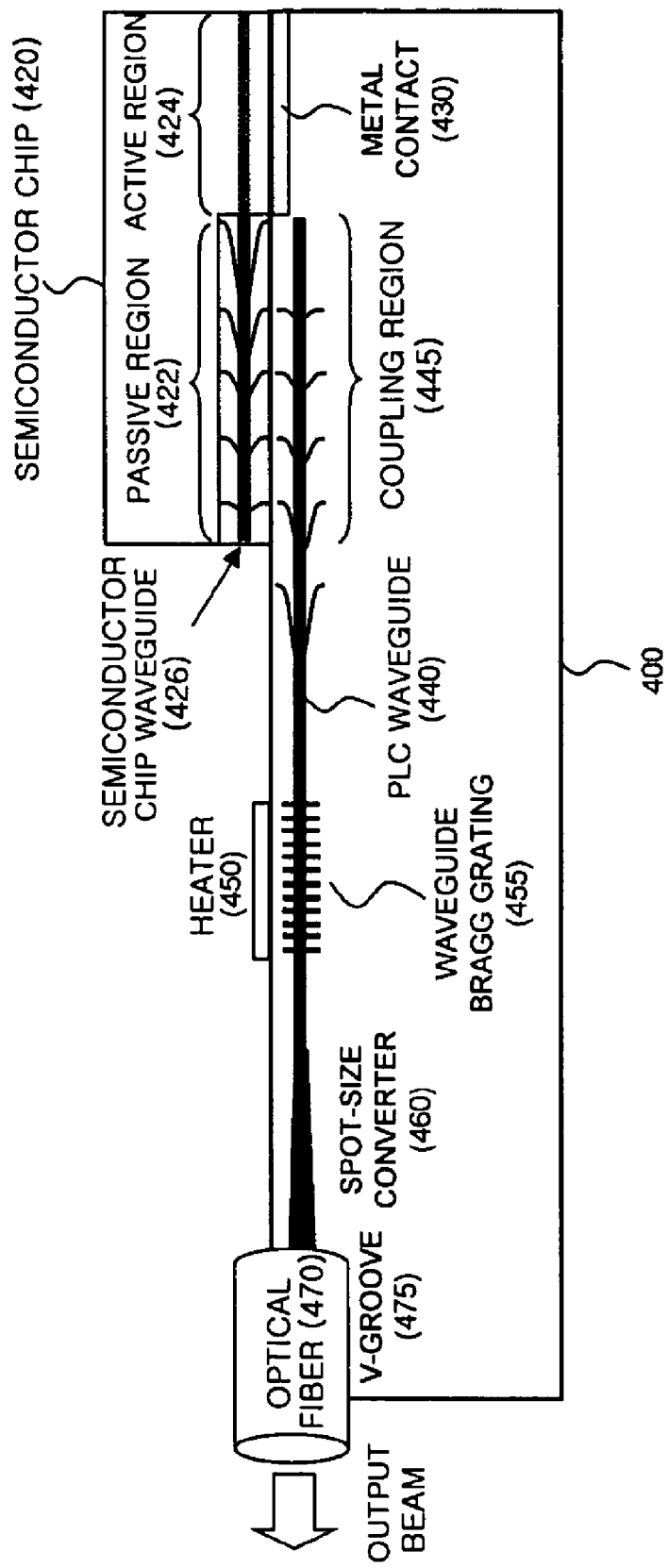
FIG. 4 is a side view of an ONT optical transmission module of a surface mount integration type based on a PLC.

FIG. 4 is a side view of an ONT optical transmission module of a surface mount integration type based on a PLC. Referring to FIG. 4, a semiconductor chip 420 includes an active region 424 generating a beam and a passive region 422 for coupling the generated beam to a PLC waveguide 440 in a PLC. The semiconductor chip 420 is installed on the PLC using a surface mount integration technology.

A semiconductor substance of an InP family is used for the active region 424 of the semiconductor chip 420, and a polymer or a nitride substance is used for the passive region 422.

A semiconductor chip waveguide 426 and the PLC waveguide 440 are surface-mounted in a coupling region 445.

A WBG 455 is formed on the PLC waveguide 440, and a wavelength-tunable WBG 455 is formed by mounting a heater 450 onto the WBG 455 to control a temperature of the WBG 455. The PLC waveguide 440 coupled with an optical fiber 470 has a spot-size converter 460, which has a structure in which the size of a beam in the PLC waveguide 440 is getting larger, in order to increase an optical coupling efficiency with the optical fiber 470. An alignment process can be simplified by that the optical fiber 470 is passive-aligned on the PLC using a V-groove (VG) 475.

The WBG 455 whose reflection band is tuned by a thermo-optic effect is placed on the waveguide of the PLC, and a wavelength of a beam finally outputting into the optical fiber 470 is determined by an external cavity formed by a rear surface of the semiconductor chip 420 and the WBG 455.

Since a wavelength-tunable range of the WBG 455 according to the thermo-optic effect is no more than 10 nm when silica is used as a substance for the PLC waveguide 440, the number of channels may be too small to use this material a WDM (for example, 6 channels on 200 GHz spacings). Accordingly, the economical efficiency is low. The wavelength-tunable range of the WBG 455 can be extended as wide as 30 nm when a polymer is used as the substance for the PLC waveguide 440, and an output wavelength can be tuned in an entire region of C-band (for example, 18 channels on 200 GHz spacings). Also, the wavelength-tunable range of the WBG 455 using the PLC waveguide 440 of a silica/polymer hybrid type can be around 10-15 nm.

A basic theory related to this is as follows.

The Bragg wavelength $\lambda B$ reflected from the WBG 455 is represented as Equation 1.

$$\lambda_B = 2 n_{eff} \Lambda. \quad \text{[Equation 1]}$$

Here, $n_{eff}$ indicates a effective refractivity of the PLC waveguide 440, and $\Lambda$ indicates a grating period of the WBG 455 in a core.

A 3 dB bandwidth $\Delta\lambda_B$ of a reflected wavelengths is determined by Equation 2, and since the bandwidth $\Delta\lambda_B$ is inversely proportional to an entire grating length, the longer an interaction length between gratings and a beam the smaller the bandwidth.

$$\frac{\Delta\lambda}{\lambda} \approx \frac{\Lambda}{L} = \frac{1}{m}. \quad \text{[Equation 2]}$$

Here, L indicates the interaction length between the gratings and the beam, and m indicates the number of gratings.

A reflection ratio R when a phase condition of an incident wave and a reflection wave is fully satisfied is determined by a coupling coefficient k of the two waves and a coupling length L. In order to obtain a desired Bragg wavelength, $\Delta n$ and L with respect to a given effective refractivity $n_{eff}$ must be determined. In order to suppress side lobes generated around a reflected Bragg wavelength, a grating depth can be apodized with a Gaussian profile, for example.

A wavelength-tunable characteristic of the WBG 455 is represented as Equation 3 due to a correlation between a conducted thermopower and a transition wavelength.

$$\Delta\lambda_B = 2 \frac{\Lambda}{m} \frac{\delta n}{\delta T} \Delta T \quad \text{[Equation 3]}$$

Here, m indicates a degree of Bragg diffraction, and $$\frac{\delta n}{\delta T}$$

indicates a thermo-optic coefficient.

When the thermo-optic coefficient is $2\times10^{-3}[K^{-1}]$, L=0.5 μm, m=1, $\Delta\lambda_B=2\Delta T$ nm, a temperature change of about 15° K. is required to tune a 30 nm wavelength. The thermo-optic coefficient is about $1\times10^{-5}[K^{-1}]$ for a silica, and about $1.5\times10^{-4}[K^{-1}]$ for a polymer. Therefore, for the same temperature change applied, a variance of the center wavelength of the reflection band of the WBG 455 with a polymer substance is about 15 times larger than that for a silica substance.

A characteristic of a conventional tunable polymer WBG is as follows:

$\Delta\lambda=-0.3$ nm/° C. (a change ratio of a center optical wavelength according to a temperature change)

$\Delta n=-2\times10^{-4}$/° C. (a change ratio of a refractivity according to a temperature change)

A wavelength-tunable region: 1535-1560 nm (25 nm tuning)

A voltage for 25 nm tuning: 50 mV.

This example shows that the technical characteristic suggested by the embodiment of the present invention can be realized.

Figure 5:
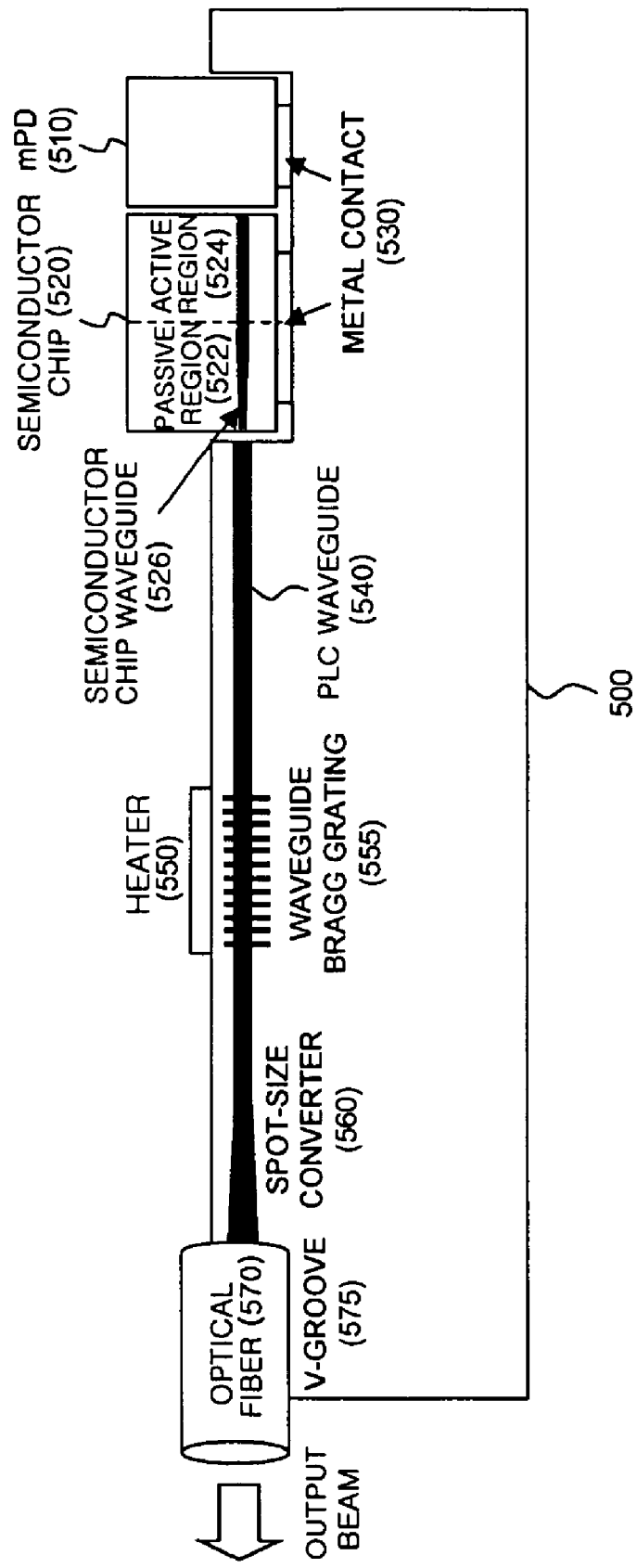
FIG. 5 is a side view of an ONT optical transmission module of a butt mount integration type based on a PLC.

FIG. 5 is a side view of an ONT optical transmission module of a butt-mounted LD integration type on a PLC.

Referring to FIG. 5, a basic configuration is equal to that of FIG. 4. However, a configuration of a semiconductor chip 520 and an optical coupling method of butt-mounting with a PLC waveguide 540 are different from the configuration of FIG. 4. A passive region 522 of the semiconductor chip 520 increases a size of an optical beam generated by an active region 524 in order to improve an optical coupling efficiency. In general, a far-field angle may be used as an index of an increase of the size of the optical beam. It is preferable that each far-field angle of vertical and horizontal directions is set below 15° for a good coupling. The same description as in FIG. 4 is omitted.

FIGS. 6A and 6B are graphs for illustrating a multi mode operational ECL according to an embodiment of the present invention.

Referring to FIGS. 6A and 6B, a magnitude of full-width at half-maximum intensity (FWHM) of a reflection band of a WBG is as large as it can include a plurality of ECL cavity modes and smaller than a designated WDM channel (wavelength) spacing.

As shown in FIGS. 6A and 6B, a WDM channel spacing is taken as 200 GHz, and the FWHM of the reflection band of the WBG is taken as 0.8 nm. The multi mode operational ECL has a disadvantage that the WDM channel spacing must be wider comparing with a single mode operational ECL. On the contrary, the multi mode operational ECL has an advantage that an influence of a mode hopping according to a temperature change and an input current change appearing in the single mode operational ECL can be reduced as much as practically negligible.

Figure 7B:
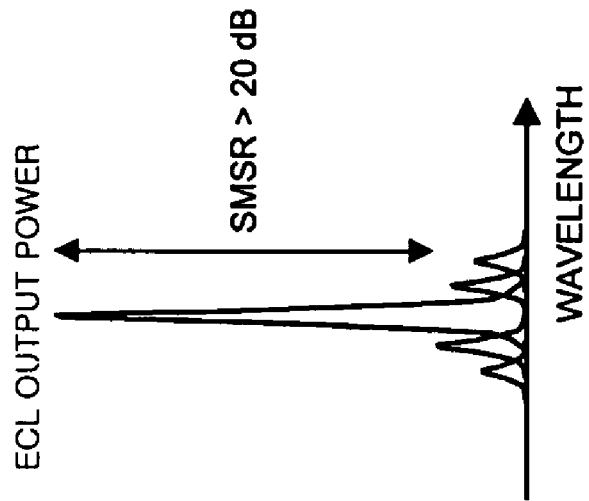
FIGS. 7A and 7B are graphs for illustrating a single mode operational ECL according to another embodiment of the present invention.
Figure 7A:
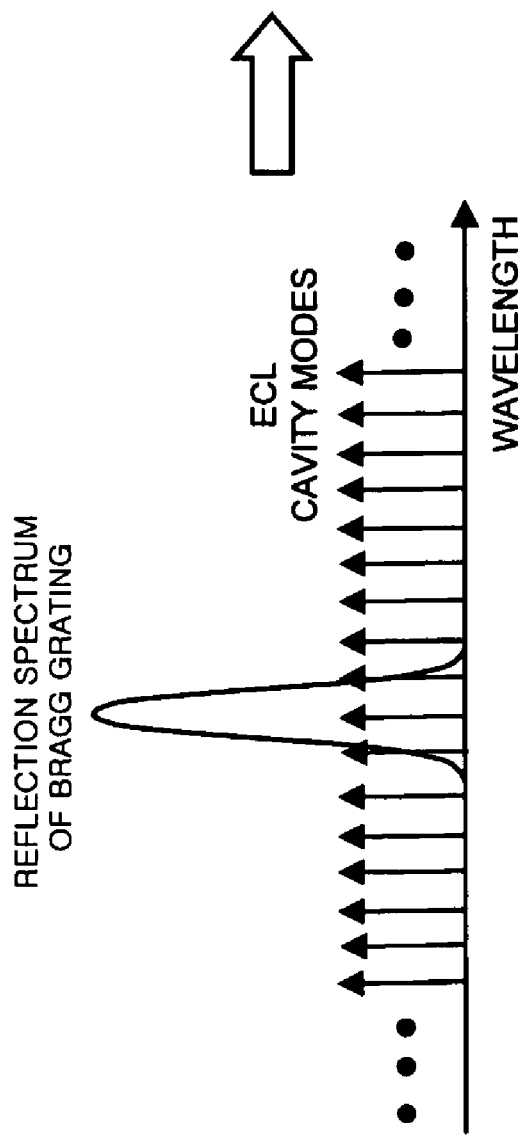

FIGS. 7A and 7B are graphs for illustrating a single mode operational ECL according to another embodiment of the present invention.

Referring to FIGS. 7A and 7B, if a bandwidth of a WBG mode is reduced so that only one ECL cavity mode resonates, the power difference between a main mode and adjacent modes is large. That is, an output mode can be considered as a single mode in terms of a large side-mode suppression ratio (SMSR).

FIGS. 8A, 8B and 8C are graphs for illustrating a mode hopping phenomenon in an ECL structure.

Referring to FIGS. 8A, 8B and 8C, only a specific ECL cavity mode can be generated by reducing a WBG reflection bandwidth as shown in FIG. 8A. In this case, there is an advantage that the single mode is generated. However, when a temperature and current is changed in a cavity, an cavity mode is transited to an adjacent mode. A wavelength transition due to the temperature change of the ECL is about 0.05 nm/° C. even if the wavelength transition varies according to a design, and a center wavelength variation of a WBG reflection band is about 0.01 nm/° C. for a silica.

FIGS. 8A, 8B and 8C show a phenomenon that a resonant ECL mode is transited to an adjacent mode of a shorter wavelength according to a temperature change, where it is assumed that a center wavelength of the WBG reflection band is fixed regardless of the temperature change.

In the transition process, when optical output powers of two adjacent ECL cavity modes are comparable as shown in FIG. 8B, the mode transition phenomenon can damage an L-1 characteristic significantly, and a data transmission error can occur especially when the light source is directly modulated.

FIGS. 9A and 9B are graphs for illustrating a mechanism suppressing the mode hopping in a case of the single mode operational ECL.

Referring to FIGS. 9A and 9B, a phase control section is inserted in an external cavity comprised in the ECL. In general, when a bias current to a semiconductor active region generating light increases, wavelength an ECL cavity mode is shifted to a longer wavelength region such as a B direction of FIG. 9A. This wavelength shift can be compensated by controlling a current injected into the phase control section as shown in Equations 4 and 5.

$$I_a = I_{a0} + \Delta I \quad \text{[Equation 4]}$$

$$I_p = I_{p0} + \alpha \Delta I \quad \text{[Equation 5]}$$

Here, $I_{a0}$ indicates an LD bias current, $I_{p0}$ indicates a DC current component for the phase control section, $\Delta I$ indicates a variation of the LD bias current, and $\alpha$ indicates a value obtained by characterizing an amount of a current to be input to the phase control section, which can compensate an ECL cavity mode shift due to $\Delta I$, which represents an efficiency of wavelength shift compensation of the phase control section.

A sign of the $\alpha$ value is determined by a sign of a thermo-optic coefficient or an electro-optic coefficient of a waveguide substance used in the phase control section. For example, in a case of the polymer, the $\alpha$ value is a positive value since the thermo-optic coefficient is a negative value, and in a case of the silica, the $\alpha$ value is a negative value since the thermo-optic coefficient is a positive value.

Figure 10:
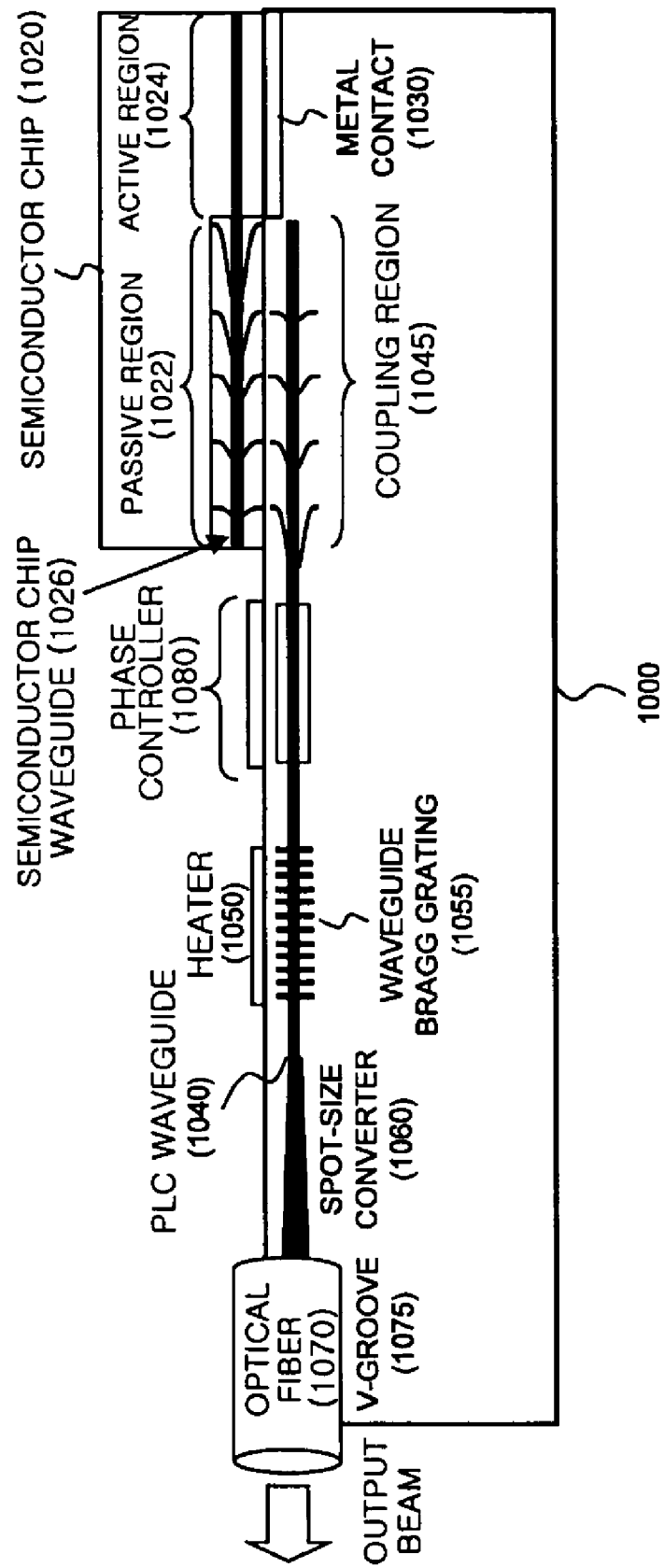
FIG. 10 is a side view of a single mode operational ECL as an example of an ONT optical transmission module based on a silica PLC according to an embodiment of the present invention.

FIG. 10 is a side view of a single mode operational ECL as an example of an ONT optical transmission module based on a silica PLC according to an embodiment of the present invention.

Referring to FIG. 10, a configuration of FIG. 10 is almost same as a configuration of a PLC-ECL of FIG. 4 in which a wavelength is thermally tunable. A difference from FIG. 4 is that a phase control section 1080 using a thermo-optic or electro-optic effect is inserted for stability of the ECL resonant mode as described in FIG. 9. FIG. 4 is referred to for parts undescribed in FIG. 10.

Figure 11:
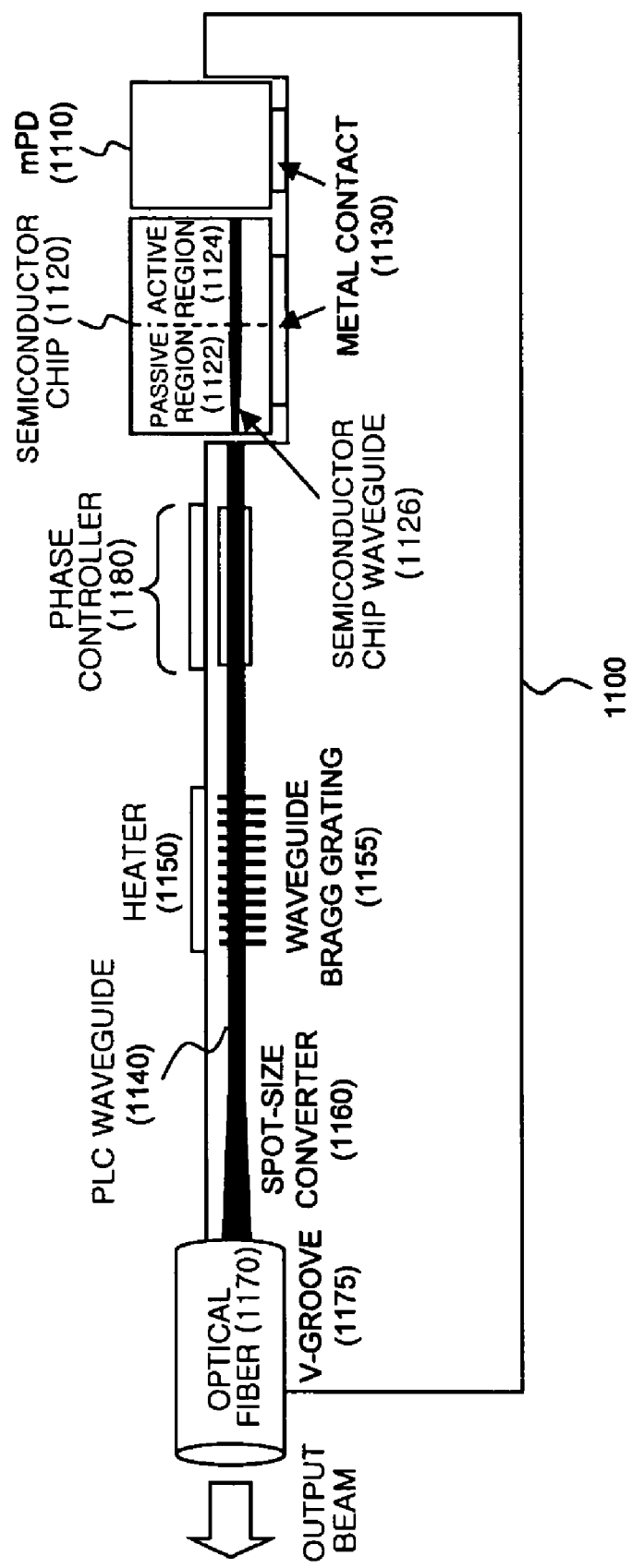
FIG. 11 is a side view of a single mode operational ECL as another example of the ONT optical transmission module based on the silica PLC according to an embodiment of the present invention.

FIG. 11 is a side view of a single mode operational ECL as another example of the ONT optical transmission module based on the silica PLC according to an embodiment of the present invention.

Referring to FIG. 11, a configuration of FIG. 11 is almost same as a configuration of a PLC-ECL of FIG. 5 in which a wavelength is thermally tunable. A difference from FIG. 5 is that a phase control section 1180 using the thermo-optic or electro-optic effect is inserted for stability of the ECL resonant mode as described in FIG. 9. FIG. 5 is referred to for parts undescribed in FIG. 11.

FIGS. 12A and 12B are respectively a top view and a side view of a multi mode operational ECL array as an example of an OLT optical transmission module (OLT-TOSA) using the surface mount method according to an embodiment of the present invention.

Referring to FIGS. 12A and 12B, the polymer, silica, or nitride substance can be used for PLC waveguides 1240. An FP-LD array 1220' forms an ECL array by aligning one to one with a WBG array having reflection bands with frequency spacings recommended by ITU-T. In each ECL, a center wavelength of a relevant WBG reflection band is set so that a WDM optical signal with a predetermined frequency spacing can be transmitted, and a reflection bandwidth is set so that 3-5 ECL cavity modes can exist in the WBG reflection band.

The multi-wavelength optical signals output from the output ends of the ECL array are finally wavelength-multiplexed by a WDM MUX 1290 monolithicly integrated on one PLC chip. An optical fiber pigtail process of the OLT-TOSA can be simplified to a single pigtail by integrating the ECL array and the WDM MUX 1290 on one PLC. An arrayed-waveguide grating (AWG) or WDM filters can be used as the WDM MUX 1290.

A semiconductor chip 1220 generating light is formed in an FP-LD array 1220' bar. In a method of using individual FP-LD chips for ECLs, total processing time of LD placement on a PLC takes long when individual LDs are flip-chip bonded, and the alignment of bonded chips may be affected when other chips are bonded. These problems can be solved using the FP-LD array 1220' in FIG. 12. A monitor PD (mPD) 1210 is formed in an mPD array 1210' bar and monitors an optical output power of each ECL.

Figure 13A:
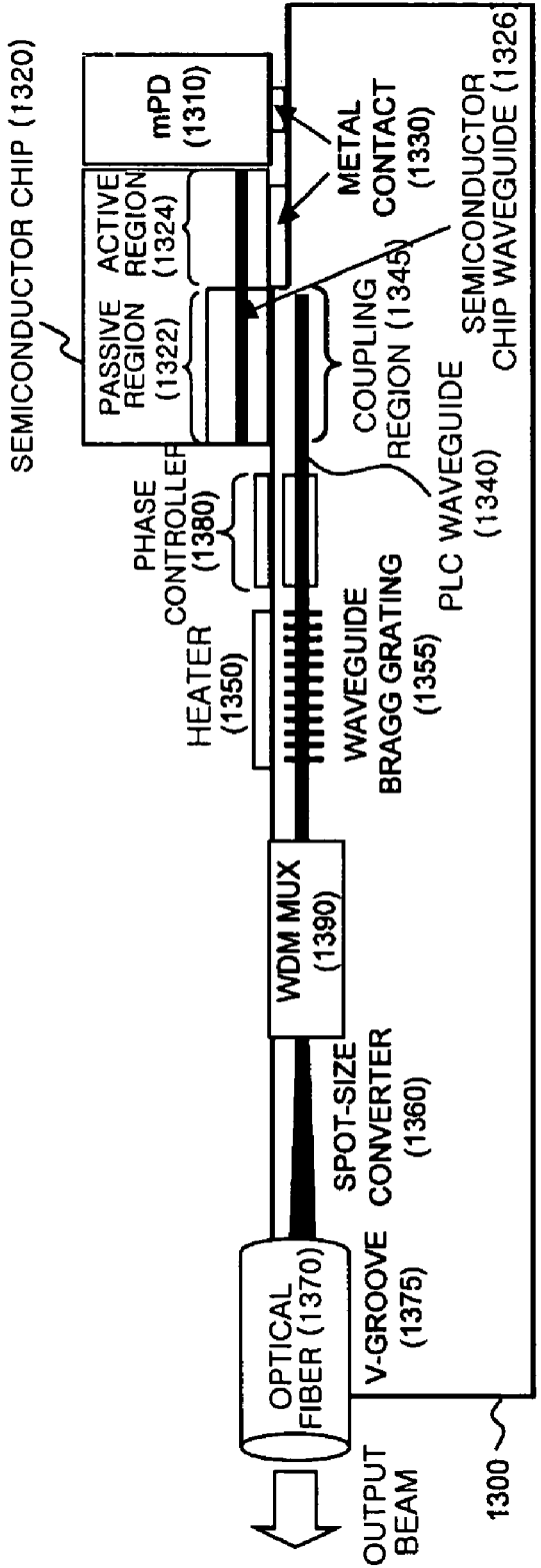
FIGS. 13A and 13B are respectively a top view and a side view of a single mode operational ECL array as another example of the OLT-TOSA using the surface mount method according to an embodiment of the present invention.
Figure 13B:
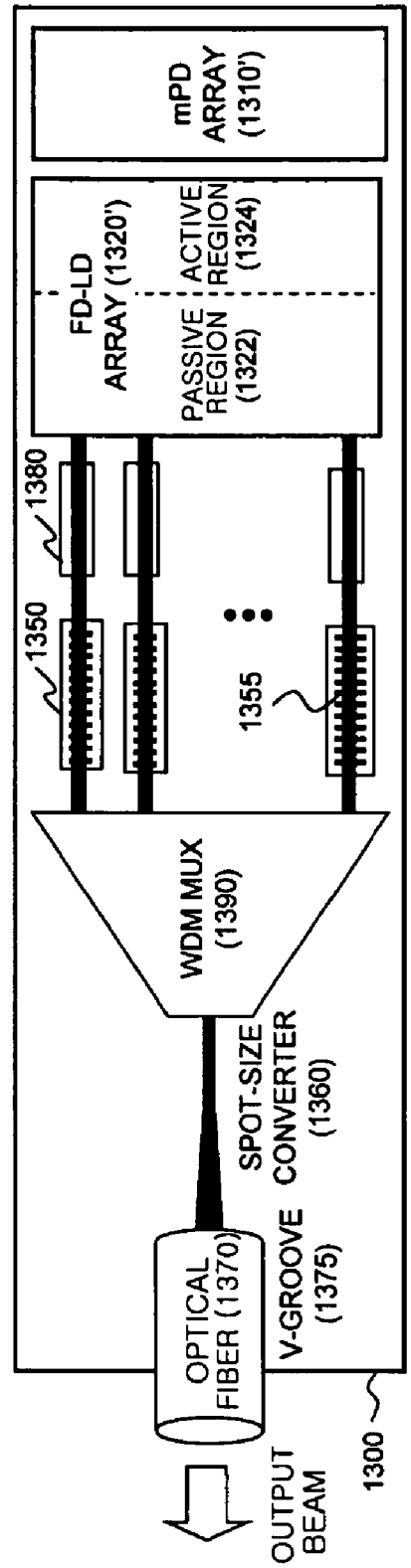

FIGS. 13A and 13B are respectively a top view and a side view of a single mode operational ECL array as another example of the OLT-TOSA using the surface mount method according to an embodiment of the present invention.

Referring to FIGS. 13A and 13B, in each ECL, a center wavelength of a relevant WBG reflection band is set so that a WDM optical signal with a predetermined frequency spacing can be transmitted, and a reflection bandwidth is set so that one ECL cavity mode can exist in the WBG reflection band. Phase control sections 1380 for stability of the single mode operation and fine-tuning of wavelength of the mode are inserted. Heaters 1350 or electrodes are formed on PLC waveguides 1340 so that the phase control sections 1380 can use the thermo-optic effect or the electro-optic effect. FIG. 12 is referred to for parts undescribed in FIG. 13.

Figure 14A:
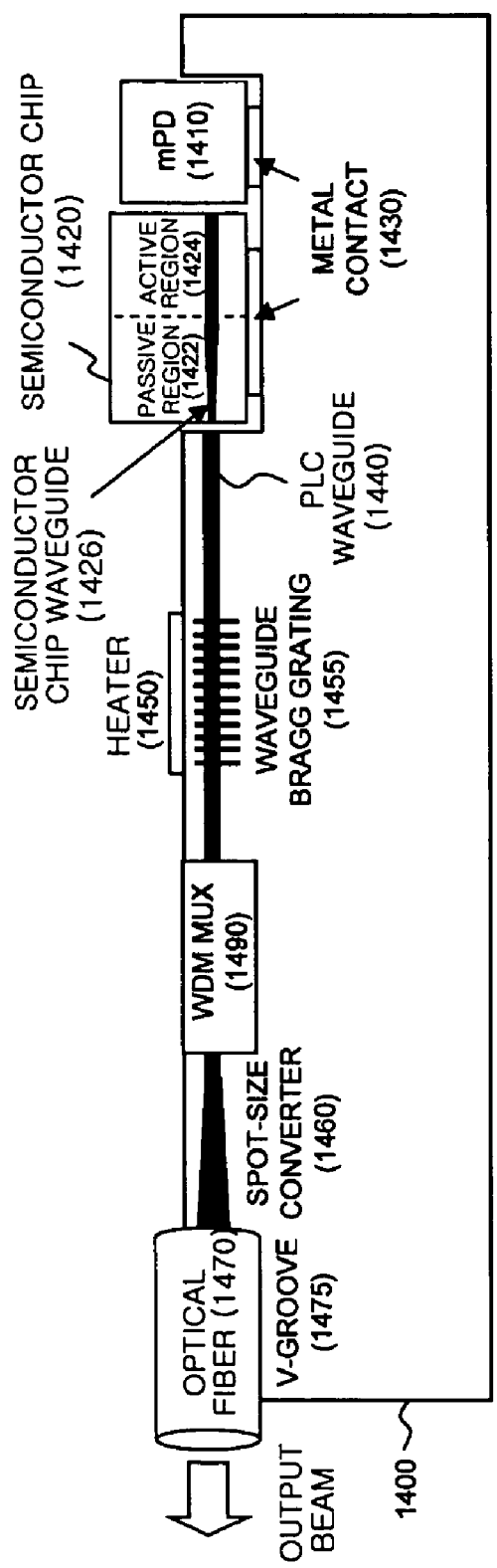
FIGS. 14A and 14B are respectively a top view and a side view of a multi mode operational ECL array as an example of the OLT-TOSA using a butt mount method according to an embodiment of the present invention.
Figure 14B:
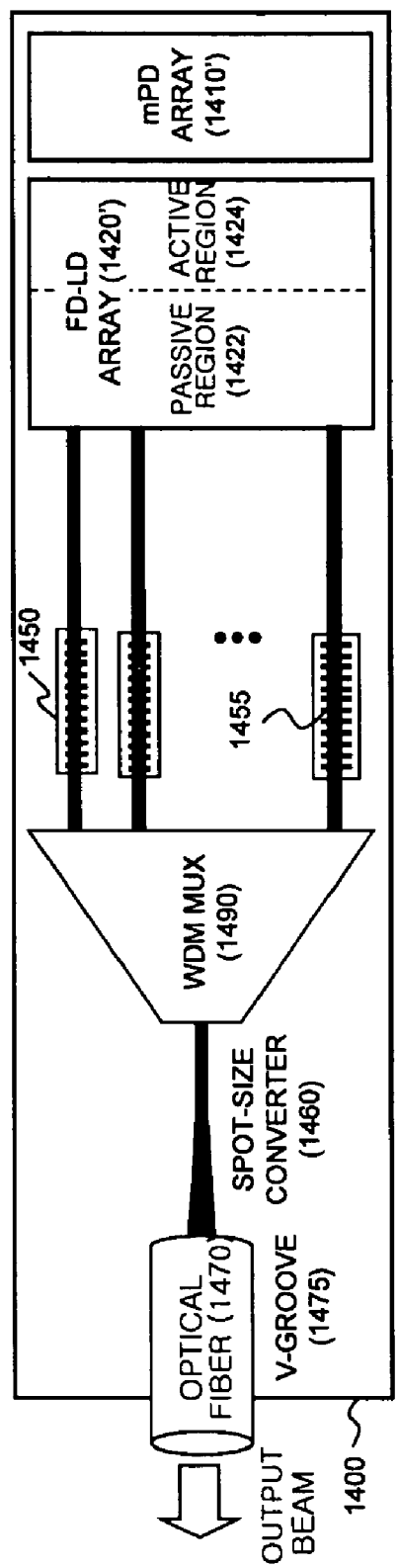

FIGS. 14A and 14B are respectively a top view and a side view of a multi mode operational ECL array as an example of the OLT-TOSA using a butt mount method according to an embodiment of the present invention.

Referring to FIGS. 14A and 14B, the polymer, silica, or nitride material can be used for PLC waveguides 1440. An FP-LD array 1420' forms an ECL array by aligning one to one with a WBG array having reflection bands with frequency spacings recommended by ITU-T. In each ECL, a center wavelength of a relevant WBG reflection band is set so that a WDM optical signal with a predetermined frequency spacing can be transmitted, and a reflection bandwidth is set so that 3-5 ECL cavity modes can exist in the WBG reflection band.

The multi-wavelength optical signals output from the output ends of the ECL array are finally wavelength-multiplexed by a WDM MUX 1490 monolithicly integrated on one PLC chip. An optical fiber pigtail process of the OLT-TOSA can be simplified to one pigtail by integrating the ECL array and the WDM MUX 1490 on one PLC. An AWG or WDM filters can be used as the WDM MUX 1490.

Figure 15A:
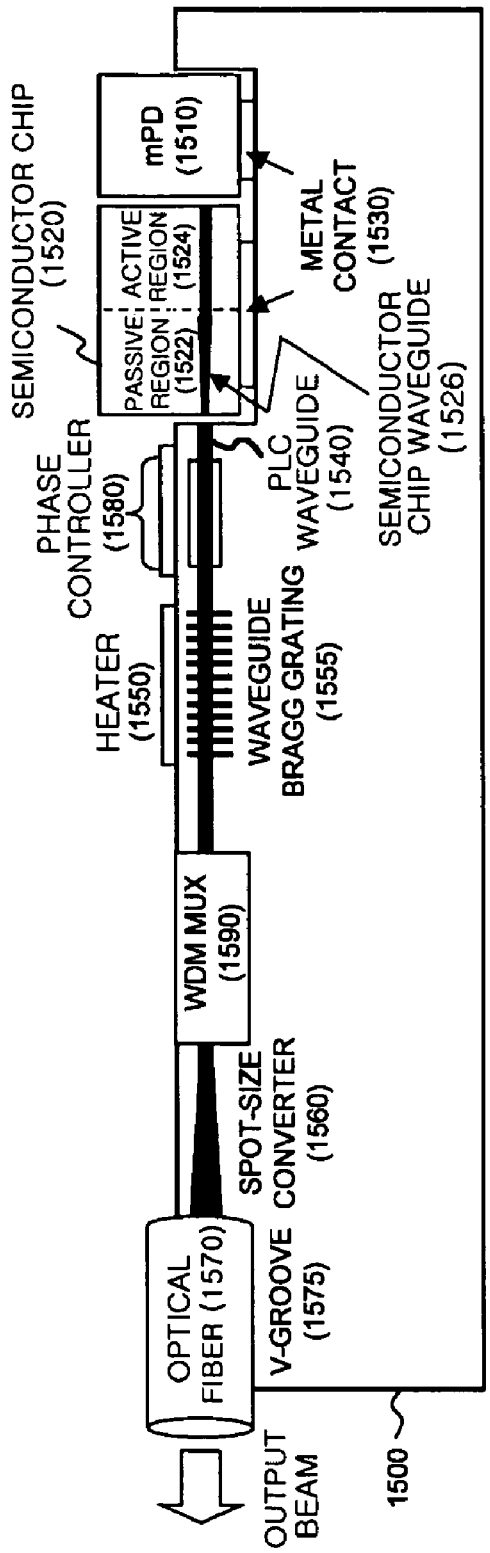
FIGS. 15A and 15B are respectively a top view and a side view of a single mode operational ECL array as another example of the OLT-TOSA using the butt mount method according to an embodiment of the present invention.
Figure 15B:
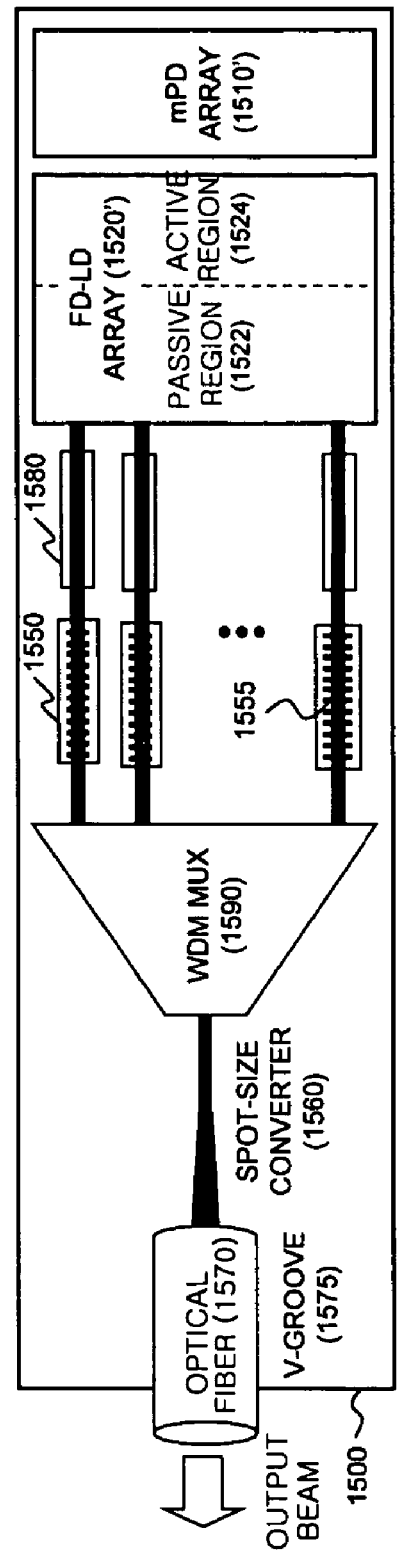

FIGS. 15A and 15B are respectively a top view and a side view of a single mode operational ECL array as another example of the OLT-TOSA using the butt mount method according to an embodiment of the present invention.

Referring to FIGS. 15A and 15B, in each ECL, a center wavelength of a relevant WBG reflection band is set so that a WDM optical signal with a predetermined frequency spacing can be transmitted, and a reflection bandwidth is set so that one ECL cavity mode can exist in the WBG reflection band. Phase control sections 1580 for stability of the single mode operation and fine-tuning of wavelength of the mode are inserted. Heaters 1550 or electrodes are formed on PLC waveguides 1540 so that the phase control sections 1580 use the thermo-optic effect or the electro-optic effect. FIG. 14 is referred to for parts undescribed in FIG. 15.

Figure 16A:
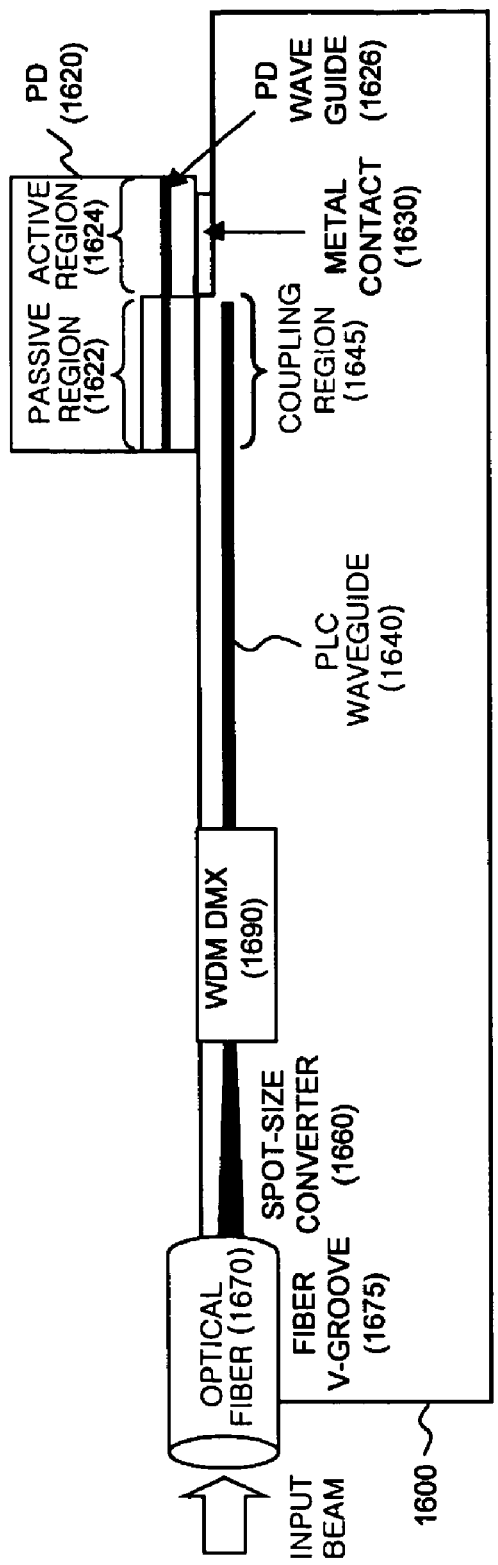
FIGS. 16A and 16B are respectively a top view and a side view of an OLT optical reception module (OLT-ROSA) using the surface mount method according to an embodiment of the present invention.
Figure 16B:
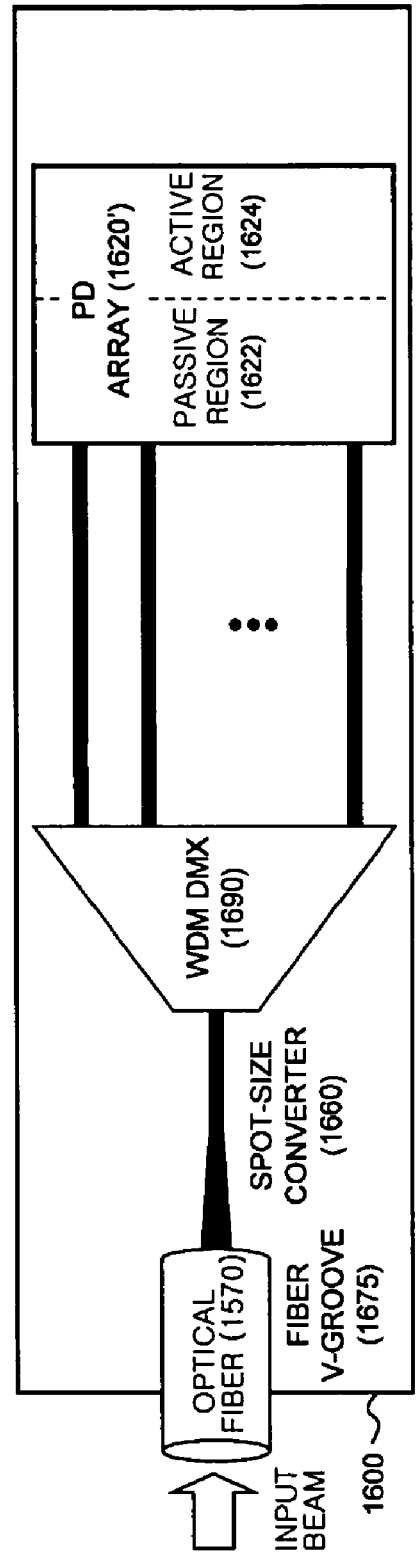

FIGS. 16A and 16B are respectively a top view and a side view of an OLT optical reception module (OLT-ROSA) using the surface mount method according to an embodiment of the present invention.

Referring to FIGS. 16A and 16B, the polymer, silica, or nitride material can be used for PLC waveguides 1640. A multi-wavelength optical signal input via an optical fiber 1670 is divided into wavelengths by a WDM DMX 1690 monolithicly integrated on one PLC chip and each of wavelengths inputs to each of PDs 1620. An optical fiber pigtail process is simplified as one pigtail by integrating the WDM DMX 1690 on a PLC. An AWG or a WDM filter can be used as the WDM DMX 1690.

The PDs 1620 includes a passive region 1622 (an incident beam is transmitted to an active region 1624 using a directional coupling) and the active region 1624 (a region of detecting intensity of the incident beam) and surface-mounted on the PLC chip on which the WDM DMX is integrated. In order to make an alignment process with the PLC waveguides 1640 easy, PDs 1620 are formed in a PD array bar rather than individual semiconductor chips.

Figure 17A:
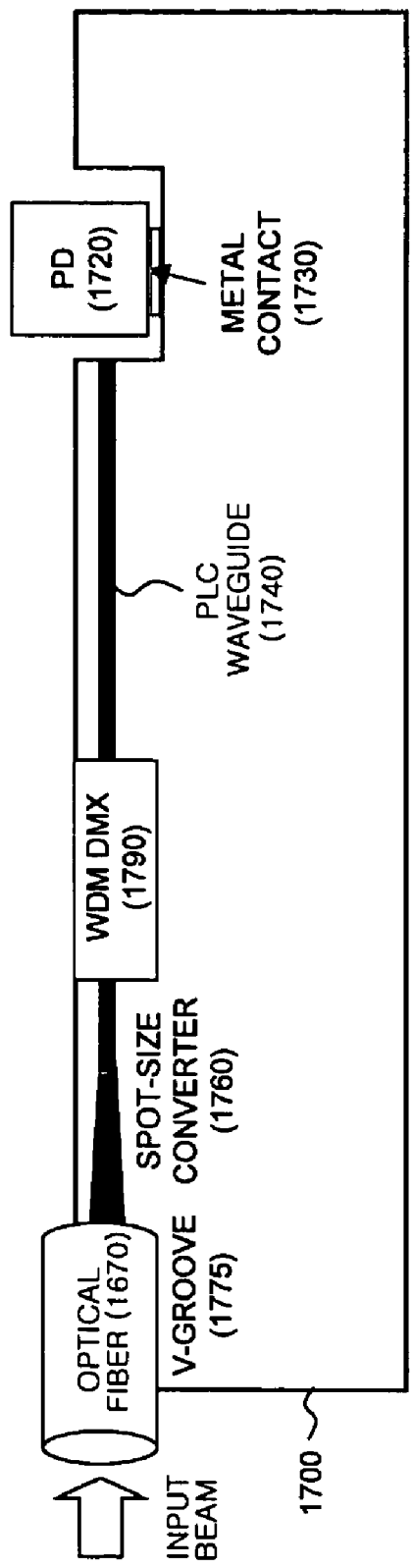
FIGS. 17A and 17B are respectively a top view and a side view of an OLT-ROSA in which a wavelength can be tuned by heat based on a butt mount type of ECL.
Figure 17B:
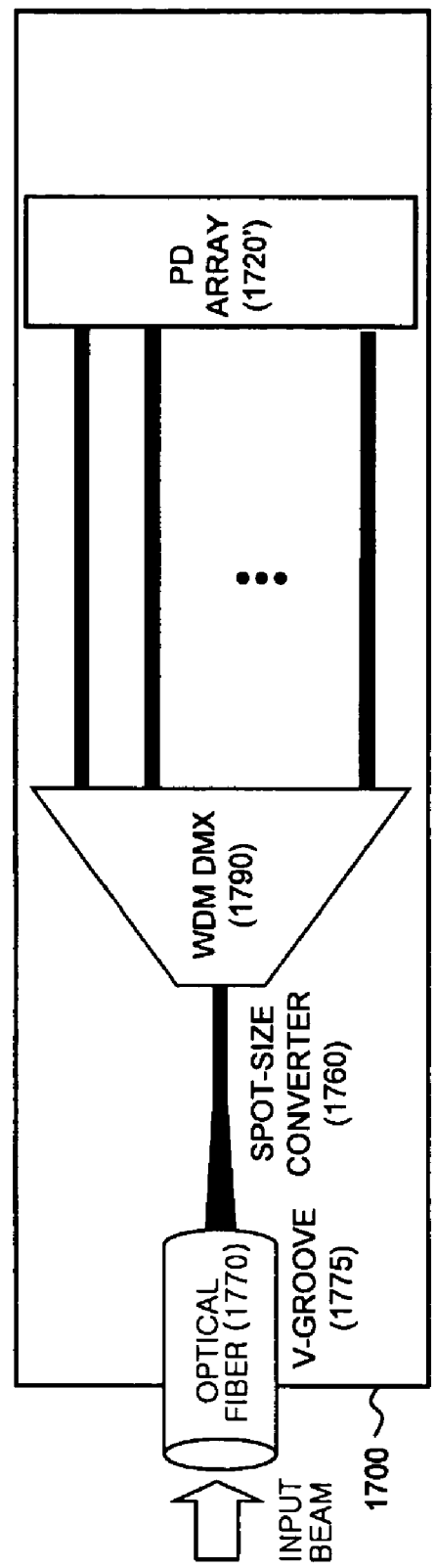

FIGS. 17A and 17B are respectively a top view and a side view of an OLT-ROSA using the butt mount method according to an embodiment of the present invention.

Referring to FIGS. 17A and 17B, A PD array 1720 does not have a passive region and is coupled with PLC waveguides 1740 by a butt coupling. FIG. 17 is referred to for parts undescribed in FIG. 16.

The present invention may be embodied in a general-purpose computer by running a program from a computer readable medium, including but not limited to storage media such as magnetic storage media (ROMs, RAMs, floppy disks, magnetic tapes, etc.), optically readable media (CD-ROMs, DVDs, etc.), and carrier waves (transmission over the internet). The present invention may be embodied as a computer readable medium having a computer readable program code unit embodied therein for causing a number of computer systems connected via a network to effect distributed processing.

As described above, the present invention relates to a WDM-PON system based on a wavelength-tunable ECL light source and gives following effects.

First, according to an embodiment of the present invention suggesting integrated multi-wavelength optical module structures to be installed in a CO, a problem with physical installation volume of optical modules of an OLT due to accommodation of a large number of subscribers in the CO based on the WDM-PON can be solved.

In the optical transmission module of the OLT, since a FP-LD array (LD chip bar) is mounted on a PLC, designated optical wavelengths are output according to a cavity condition by a WBG array formed in the PLC, and a WDM MUX is formed in the PLC in order to multiplex optical wavelengths output from the WBG array, important problems required for the OLT transmitter, such as simple packaging, a high yield, and a physical size efficiency (compactness), can be solved.

In an optical reception module of the OLT, since a PD array (PD chip bar) is mounted on a PLC, a WDM DMX demultiplexing an input optical signal is formed in the PLC, and the WDM DMX and the PD array are connected using a waveguide formed in the PLC, important problems required for the OLT receiver, such as simple packaging, a high yield, and a physical size efficiency, can be solved.

Second, according to an embodiment of the present invention, low-price, mass productivity, easy installation, and inventory management problems of an ONT can be solved. When an upstream optical wavelength from an ONT to an OLT is set, the ONT can automatically set the upstream optical wavelength by the OLT transmitting upstream optical wavelength information included in a downstream optical signal to the ONT after the ONT is installed, or an installer can manually set the upstream optical wavelength of the ONT when the ONT is installed. Therefore, since a specific optical wavelength is not designated to the ONT and an upstream optical wavelength determined by a control of the OLT or the installer is set to a relevant ONT, low-price, mass productivity, easy installation, and inventory management problems of the ONT can be solved.

Third, since an output light of a PLC-ECL according to an embodiment of the present invention is coherent, spontaneous-spontaneous beat noise does not exist, and since a line width is sufficiently narrow, 2.5 Gbps data can be sufficiently transmitted over a 20 Km distance. Therefore, the PLC-ECL type can be free from disadvantages of operational instability and a transmission rate limitation of about 1 Gbps according to a temperature change in a conventional injection-locking method. Also, since module-packaging including an optical fiber pigtail can be fully passive, mass production is possible. Accordingly, optical modules according to an embodiment of the present invention can be manufactured in a low price comparing with those by conventional active alignment packaging methods.

While this invention has been particularly shown and described with reference to preferred embodiments thereof, it will be understood by those skilled in the art that various changes in form and details may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A wavelength division multiplexing passive optical network (WDM-PON) system based on a wavelength-tunable external cavity laser (ECL) light source, the WDM-PON system comprising:

an optical line terminal (OLT) comprising an optical transmitter in which a first wavelength-tunable waveguide Bragg grating (WBG) is formed, which is composed of a first ECL array generating optical wavelengths for data transmission, and an optical receiver composed of a photo diode (PD) array, wherein the optical transmitter further comprises a first WDM multiplexer (MUX) multiplexing a plurality of optical wavelengths output from the first ECL array and the optical receiver further comprises a first WDM demultiplexer (DMX) receiving a multiplexed optical wavelength and dividing the input multiplexed optical wavelength into a plurality of optical wavelengths;

a plurality of optical network terminals (ONTs), each ONT comprising an optical receiver receiving an optical wavelength for data transmission transmitted from the OLT and an optical transmitter in which a second wavelength-tunable WBG is formed, the optical transmitter composed of a second ECL generating, independently of a received downstream optical wavelength, a wavelength-tunable optical wavelength for upstream transmission, the optical transmitter further comprising a phase controller located between an active region of the second ECL and the second WBG, the phase controller to receive an injected current to compensate for a variation in a bias current injected into the active region, each ONT also comprising a wavelength controller to control a temperature applied to the second wavelength-tunable WBG based on wavelength control data received from the OLT and an optical power output from the second ECL;

a second WDM DMX, which is located in a main distribution frame (MDF) placed near the plurality of ONTs, divides a multiplexed optical wavelength transmitted from the first WDM MlUX via an optical fiber into the plurality of optical wavelengths, and connects each optical wavelength to a relevant ONT of the plurality of ONTs; and a second WDM MUX, which is located in the MDF placed near the plurality of ONTs, multiplexes a plurality of optical wavelengths output from optical transmitters of the plurality of ONTs, and transmits the multiplexed optical wavelengths to the first WDM DMX of the OLT via an optical fiber, wherein the wavelength-tunable optical wavelength for upstream transmission is determined by a physical location of an input port of the second WDM MUX located near the ONT.

2. The WDM-PON system of claim 1, wherein downstream optical wavelength information to connect a relevant optical wavelength to a relevant ONT of the plurality of ONTs, determined by physical location of an output port of the second WDM DMX is stored in the OLT as network setup information.

3. The WDM-PON system of claim 1, wherein an upstream optical wavelength of an ONT is automatically set by the OLT using stored upstream optical wavelength information of the ONT in the OLT as the network setup information.

4. The WDM-PON system of claim 1, wherein reflection center wavelengths and bandwidths of the first and second WBGs are pre-set, and the first and second WBGs have predetermined frequency spacings.

5. An OLT based on a wavelength-tunable ECL light source in a WDM-PON system based on a wavelength-tunable ECL light source, the OLT comprising:

an optical transmitter comprising an ECL array generating tunable optical wavelengths for data transmission, the ECL array formed with an LD array and a WBG array in a planar lightwave circuit (PLC), the optical transmitter to transmit upstream wavelength information with downstream data to each of a plurality of optical network terminals (ONTs) for setting an upstream wavelength independently of a received downstream optical wavelength, the optical transmitter further comprising a phase controller located between the LD array of the ECL array and the WBG array, the phase controller to receive an injected current to compensate for a variation in a bias current injected into the LD array;

a WDM MUX multiplexing a plurality of optical wavelengths output from the ECL array of the optical transmitter;

a WDM DMX dividing multiplexed optical wavelengths input from the plurality of ONTs and distributing the plurality of optical wavelengths; and an optical receiver composed of a PD array detecting the plurality of optical wavelengths distributed from the WDM DMX, wherein, in the optical transmitter, the number of optical fiber pigtails output to the ONTs is one, by integrating the ECL array and the WDM MUX in the same chip of the PLC.

6. The OLT of claim 5, wherein the ECL array is formed so that a semiconductor laser chip composed of an FP-LD array is mounted on the PLC and a the WBG array is formed in the PLC.

7. The OLT of claim 6, wherein, in the optical transmitter, the WBG array is formed at a predetermined location on a PLC waveguide between a V-groove into which an optical fiber is inserted and the FP-LD array.

8. The OLT of claim 6, wherein the optical wavelengths for data transmission of the ECL array are changed by a effective refractivity of the PLC waveguide varying in response to a temperature change of the WBG array.

9. The OLT of claim 6, further comprising: a monitoring PD (mPD) array, which is formed around the FP-LD array and monitors optical powers of optical wavelengths generated from the FP-LD array.

10. The OLT of claim 6, wherein the semiconductor laser chip is mounted on the PLC so that waveguides formed in the semiconductor laser chip and PLC waveguides formed in the PLC are coupled through surfaces.

11. The OLT of claim 6, wherein the semiconductor laser chip is mounted on the PLC so that waveguides formed in the semiconductor laser chip and PLC waveguides formed in the PLC are butt coupled.

12. The OLT of claim 6, wherein a mode hopping effect due to a temperature change or an input current change is suppressed by including a plurality of ECL cavity modes in a reflection wavelength band of the WBG array.

13. The OLT of claim 6, further wherein the phase controller controls a phase matching condition of the ECL cavity mode, the phase controller located between the FP-LD array and the WBG array, when a single ECL cavity mode is included in a reflection wavelength band of the WBG array.

14. The OLT of claim 6, wherein a relevant optical wavelength for data transmission is output through a change of an external cavity condition by a thermo-optic effect of the WBG array formed in the PLC.

15. The OLT of claim 5, wherein, in the optical receiver, the number of optical fiber pigtails input from the ONTs is unity by integrating the PD array and the WDM DMX on the same PLC chip.

16. The OLT of claim 15, wherein the semiconductor PD chip is mounted on the PLC so that the semiconductor PD chip including the PD array and PLC waveguides formed in the PLC are coupled through surfaces.

17. The OLT of claim 15, wherein the semiconductor PD chip is mounted on the PLC so that waveguides formed in the semiconductor PD chip including the PD array and PLC waveguides formed in the PLC are butt coupled.

18. An ONT based on a wavelength-tunable ECL in a WDM-PON system based on a wavelength-tunable ECL, the ONT comprising:
    an optical receiver (Rx) receiving an optical wavelength transmitted from an OLT and converting the received optical wavelength into an electric signal;
    a data control center (DCC) separating general data and waveguide Bragg grating (WBG) control data from information converted into the electric signal by the Rx;
    a wavelength control center (WCC) receiving the WBG control data from the DCC, controlling a temperature of a WBG according to the WBG control data, and controlling, independently of a received downstream optical wavelength, an upstream optical wavelength for upstream data transmission; and
    an optical transmitter comprising an ECL to modulate upstream data onto the upstream optical wavelength and to transmit the modulated upstream data to the OLT, the optical transmitter further comprising a phase controller located between an active region of the ECL and the WBG, the phase controller to receive an injected current to compensate for a variation in a bias current injected into the active region,
    wherein the upstream optical wavelength for upstream transmission is determined by a physical location of an input port of a WDM MUX, which is located near the ONT for transmitting multiplexed optical wavelengths to the OLT.

19. The ONT of claim 18, wherein the upstream optical wavelength is manually set when the ONT is installed.

20. The ONT of claim 18, wherein the OLT transmits upstream optical wavelength information, which can control an upstream optical wavelength transmitted from a relevant ONT to the OLT, to the relevant ONT through a downstream optical wavelength determined to the relevant ONT of a plurality of ONTs.

21. The ONT of claim 20, wherein the ONT transmits upstream optical wavelength information to the WCC when the ONT receives the upstream optical wavelength information through a downstream optical wavelength transmitted from the OLT, the WCC permits the ONT to be tuned into a relevant upstream optical wavelength by supplying a predetermined current to a wavelength controller of the ECL, and the upstream data is transmitted to the OLT by modulating the upstream data onto the upstream optical wavelength when the ONT is tuned into the upstream optical wavelength.

22. The ONT of claim 18, wherein the WCC controls a reflection center wavelength of the WBG with reference to an optical wavelength information transmitted from the OLT by controlling a temperature of the WBG using a stored wavelength-temperature information when the wavelength information received from the OLT is separated by the DCC and transmitted to the WCC.

23. The ONT of claim 18, wherein the ECL is formed so that a semiconductor chip composed of an FP-LD is mounted on the PLC and the WBG is formed in the PLC.

24. The ONT of claim 23, wherein the ECL further comprises an mPD monitoring a power of the ECL wherein the mPD monitors an optical power of the ECL by feedbacking the optical power information to the WCC.

25. The ONT of claim 23, wherein the ONT outputs a designated optical wavelength in response to a variation of an external cavity condition by a thermo-optic effect of the WBG formed in the PLC.

26. The ONT of claim 23, wherein the semiconductor chip composed of the FP-LD is mounted on the PLC in a surface mount method.

27. The ONT of claim 23, wherein the FP-LD is a semiconductor chip composed of an active region generating light and a passive region for coupling the light generated in the active region to a PLC waveguide in the PLC.

28. The ONT of claim 27, wherein the passive region is formed so that an amplitude of an optical beam generated in the active region is expanded in order to increase an optical coupling efficiency.

29. The ONT of claim 23, wherein the optical wavelength output via an optical fiber is determined by an external cavity formed by the semiconductor chip and the PLC.

30. The ONT of claim 23, wherein a mode hopping effect due to a temperature change or an input current change is suppressed by including a plurality of ECL cavity modes in a reflection wavelength band of the WBG.

31. The ONT of claim 23, wherein the phase controller controls a phase matching condition of the ECL cavity mode, the phase controller located between the FP-LD array and the WBG, when one ECL cavity mode is included in a reflection wavelength band of the WBG.

32. The ONT of claim 31, wherein the mode hopping effect of shifting a center wavelength output from the ECL is suppressed by changing a temperature or a current applied to the phase controller.

33. The ONT of claim 23, wherein the semiconductor chip is mounted on the PLC so that waveguides formed in the semiconductor chip and a PLC waveguide formed in the PLC are surface-mounted.

34. The ONT of claim 23, wherein the semiconductor chip is mounted on the PLC so that waveguides formed in the semiconductor chip and a PLC waveguide formed in the PLC are butt-mounted.

35. A method of controlling an upstream optical wavelength of an ONT in WDM-PON system, the method comprising:
    determining upstream optical wavelength information of the ONT corresponding to a downstream optical wavelength predetermined to the ONT newly installed by being connected to a network;
    in an OLT, loading the upstream optical wavelength information onto the downstream optical wavelength assigned to the ONT and transmitting the upstream optical wavelength information and downstream data to the ONT, the upstream optical wavelength information determined by a physical location of an input port of a WDM MUX, which is located near the ONT for transmitting multiplexed optical wavelengths to the OLT;

in the ONT, separating the downstream data from the upstream optical wavelength information and generating, independently of a received downstream optical wavelength, an upstream optical wavelength based on the upstream optical wavelength information from the OLT; and in the ONT, loading upstream data onto the generated upstream optical wavelength and transmitting the loaded upstream data to the OLT, wherein generating the upstream optical wavelength in the ONT further comprises:

compensating for a variation in a bias current of an laser diode of the ONT by controlling a current injected into a phase controller located between laser diode and a WBG in the ONT.

* * * * *